United States Patent [19]
Tong et al.

[11] Patent Number: 5,982,434
[45] Date of Patent: Nov. 9, 1999

[54] IMAGE SIGNAL CODING METHOD AND DEVICE THEREOF, IMAGE SIGNAL DECODING METHOD AND DEVICE THEREOF, AND RECORDING MEDIUM

[75] Inventors: Tak Yen Tong, Tokyo; Teruhiko Suzuki, Chiba; Masami Ogata, Kanagawa, all of Japan

[73] Assignee: Sony Corporation, Tokyo, Japan

[21] Appl. No.: 08/825,714

[22] Filed: Mar. 19, 1997

[30] Foreign Application Priority Data

Mar. 22, 1996 [JP] Japan .................................. 8-066641

[51] Int. Cl.$^6$ ...................................................... H04N 7/30
[52] U.S. Cl. ............................................. 348/398; 348/405
[58] Field of Search ...................................... 348/384, 390, 348/395–400, 402–405, 407–413, 415, 416, 420, 699; 358/261.1, 261.3, 426, 427, 432, 433; 382/232, 236, 238, 240, 244–248, 250, 251; H04N 7/30

[56] References Cited

U.S. PATENT DOCUMENTS

| | | | |
|---|---|---|---|
| 5,014,134 | 5/1991 | Lawton et al. | 358/261.3 |
| 5,253,058 | 10/1993 | Gharavi | 348/409 |
| 5,398,067 | 3/1995 | Sakamoto | 348/403 |
| 5,412,741 | 5/1995 | Shapiro | 348/398 |
| 5,420,636 | 5/1995 | Kojima | 348/403 |
| 5,495,292 | 2/1996 | Zhang et al. | 348/407 |
| 5,537,493 | 7/1996 | Wilkinson | 382/248 |
| 5,563,960 | 10/1996 | Shapiro | 382/240 |
| 5,657,085 | 8/1997 | Katto | 348/403 |
| 5,748,786 | 5/1998 | Zandi et al. | 382/240 |
| 5,764,805 | 6/1998 | Martucci et al. | 382/238 |
| 5,808,683 | 9/1998 | Tong et al. | 348/398 |

*Primary Examiner*—Richard Lee
*Attorney, Agent, or Firm*—Frommer Lawrence & Haug, LLP.; William S. Frommer

[57] ABSTRACT

In an image coding device and method for coding an image signal employing sub-band transforms, an inputted image signal is hierarchically divided into a plurality of frequency bands using sub-band transforms and a plurality of frequency band signals are generated, with each frequency band signal comprising sub-band transform coefficients. The sub-band transform coefficients of each frequency band signal are then coded using zero tree coding and run length coding in a more efficient manner than with related devices and methods.

36 Claims, 14 Drawing Sheets

IMAGE SIGNAL CODING METHOD AND DEVICE THEREOF, IMAGE SIGNAL DECODING METHOD AND DEVICE THEREOF, AND RECORDING MEDIUM

BACKGROUND OF THE INVENTION

1. Field of the Invention

The present invention relates to an image signal coding method and device thereof, an image signal decoding method and device thereof, and a recording medium being recorded with a recording signal capable of being decoded by an image decoding device, and more particularly relates to an image signal coding method and device thereof, an image signal decoding method and device thereof, and a recording medium capable of being widely applied to the recording of digitized moving image sequences or digitized still images onto a recording medium such as, for example, video tape, video disc or semiconductor memory etc. or capable of being widely applied to television broadcasts, television conferencing systems or communication networks.

2. Description of Related Art

In recent years, a great deal of progress has been made in research into efficient transmission and recording of digital audio, digital images and video sequences. This technology can be applied to, for example, digital video recording, videophones, interactive television and interactive games, etc. However, data compression is necessary in order to reduce the amount of data transmitted because a large amount of data is included in the image signal. Of this kind of technological research, the widely known Moving Pictures Experts Group (MPEG) technology has become standard in cooperation with the International Organization of Standardization (ISO) and the International Electrotechincal Commission (IEC). Here, an MPEG method exists that is a hybrid method that is a combination of motion compensation estimation coding and discrete cosine transforms (DCT).

Further, other coding methods such as sub-band transform coding and wavelet transform coding etc. are generally well known. These transform coding methods are generally used to compress images because image energy compression is good, as is texture region performance.

That relating to sub-band transforms is described in, for example, the reference, "J. Wood, Sub-band image coding, Kluwer Academic Publishers, Boston Mass. 1991".

Further, that relating to wavelet transforms is described in, for example, the reference, "I. Daubechies, Orthonormal bases of compactly supported wavelets, Commun. Pure Appl. Math. vol. 41. pp. 961 to 966, 1988".

In particular, with wavelet transforms it is possible to focus most of the energy of the image into a small portion of the sample while maintaining all of the energy. The uneven distribution of the energy of the transformed image is then utilized in the compression algorithm. The basic way of considering these sub-band wavelet transforms is that, for example, as shown in FIG. 2, the signal band is divided into a plurality of sub-bands and a large portion of the total energy of the image is concentrated into one frequency band (lower most frequency component band). For example, FIGS. 3A and 3B show a transform coefficient obtained from a three-layer sub-band/wavelet transform for a typical image. Layer #0 (lower most layer), layer #1, and layer #2 (upper most layer) correspond to frequency groups and as shown in FIGS. 3A and 3B, the coefficients of each group are gathered together in accordance with their spatial position. These sub-band/wavelet transform coefficients that are gathered together are first quantized. The quantized coefficients are then compressed using coding methods of a high compression efficiency such as Hoffman Coding, Variable Length Coding (VLC) or Arithmetic Coding, as are described in the following reference paper.

For example, that related to Huffman Coding such as that in, for example, "D. Huffman, A method for construction of minimum redundancy codes. Proceedings of the Institute of Radio Engineers, pp. 1098 to 1101, September 1952".

Further, that related to Arithmetic Coding technology such as that in, for example, "G. Langdon and J. Rissanen. A simple general binary source code, IEEET, Transactions on Information Theory, vol. IT-28(5), pp. 800 to 803, September 1982".

It is extremely important to gather together quantization coefficients in order to compress efficiently with little loss. A technology for an efficient data structure for gathering together quantization coefficients in order to code with little loss is one where coefficients are gathered together in different layers using a tree structure, with this tree structure being referred to here as a coefficient tree structure.

The relating to tree structures is described in, for example, the reference, "J. Shapiro. Embedded image coding using zero trees of wavelet coefficients. IEER transactions on Signal Processing. vol. 41. no. 12, pp. 3445 to 4361, December 1993", and "A. Lewis and G. Knowles. Image compression using the 2-D wavelet transform, IEEE Transactions on Image Processing. vol. 1, no. 2. pp. 244 to 250, April 1992".

With a sub-band coded hierarchical structure, coefficients belonging to the uppermost layer are removed and each coefficient of a certain layer has a relationship with the coefficient existing one layer down in the same direction and spatial position. FIGS. 3A and 3B are views showing a coefficient tree data structure comprising different layers of coefficients. In the method of J. Shapiro, the same wavebands of different wavelet transforms i.e. all of the coefficients at spatially the same positions within different layers that are the sub-trees present in the un-valued coefficients are referred to as zero sub-trees. The expressing and coding of coefficient trees (i.e. zero trees) where all of the coefficients are un-valued coefficients can be achieved with only one symbol. In other words, a zero tree can be sufficiently coded with few bits. However, when valued coefficients are distributed between different layers of coefficient trees, zero tree coding is not efficient. Zero tree coding is therefore not effective when coding valued coefficients. In this case, all of the symbols including zero have to be coded in zero tree coding.

Further, with zero tree coding, only one sub-tree can be coded at a time even in cases where all of the coefficients of neighboring coefficient trees have a high correlation.

On the other hand, a run length coding method can also be considered as a further method for coding coefficient trees. The is a typical effective method for coding consecutive symbol strings that are the same. However, it is no longer necessary to code these symbols one at a time as un-valued coefficients of quantized sub-band/wavelet transform coefficients are considered to be the same consecutive symbol. Therefore, in low bit rate coding where the likelihood of a quantization coefficient being an un-valued coefficient is very high in particular it is possible to have efficient coding. Further, when there is a high degree of correlation between neighboring trees, a plurality of trees can be encoded at one time by scanning across the trees. However, when run length coding is carried out so as to include the lowermost frequency band, the number of kinds of run length increases and the overhead due to the run length coding can increase even after changing.

As it is the object of the present invention to resolve the situation encountered in the aforementioned related image signal coding method and device thereof, it is the object of the present invention to provide an image signal coding method and device thereof, an image signal decoding method and device thereof, and a recording medium capable of coding, for example, wavelet transform coefficients occurring in sub-band coding in a more efficient manner than related methods and devices.

SUMMARY OF THE INVENTION

Therefore, in order to achieve the aforementioned objects, according to the present invention, an image coding device for coding an image signal, employing sub-band transforms, comprises a transformer and a coder. The transformer is for hierarchically dividing the inputted image signal into a plurality of frequency bands using sub-band transforms and generating a plurality of frequency band signals, with each frequency band signal comprising sub-band transform coefficients. The coder is for coding said sub-band transform coefficients of said each frequency band signal using zero tree coding and run length coding.

Further, according to the present invention, an image coding method for an image signal, employing sub-band transforms, comprises a dividing step and a coding step. The dividing step is for hierarchically dividing the inputted image signal into a plurality of frequency bands using sub-band transforms and generating a plurality of frequency band signals, with each frequency band signal comprising sub-band transform coefficients. The coding step is for coding said sub-band transform coefficients of said each frequency band signal using zero tree coding and run length coding.

Moreover, according to the present invention, an image signal decoding device for decoding coded data generated by hierarchically dividing an inputted image signal into a plurality of frequency bands using sub-band transforms, generating a plurality of frequency band signals comprising sub-band transform coefficients and coding said sub-band transform coefficients of each of said frequency band signals using zero tree coding and run length coding and generating a decoded image signal, comprises a decoder and a synthesizer. The decoder is for decoding said coded data using zero tree decoding and run length decoding and generating each frequency band signal, with each of said frequency band signals comprising a plurality of sub-band transform coefficients. The synthesizer is for synthesizing sub-bands of each of said frequency band signals and generating a decoded image signal.

Further, according to the present invention, an image signal decoding method for decoding coded data generated by hierarchically dividing an inputted image signal into a plurality of frequency bands using sub-band transforms, generating a plurality of frequency band signals comprising sub-band transform coefficients and coding said sub-band transform coefficients of each of said frequency band signals using zero tree coding and run length coding and generating a decoded image signal, comprises a decoding step and a synthesizing step. The decoding step is for decoding said coded data using zero tree decoding and run length decoding and generating each frequency band signal, with each of said frequency band signals comprising a plurality of sub-band transform coefficients. The synthesizing step is for synthesizing sub-bands of each of said frequency band signals and generating a decoded image signal.

Still further, according to the present invention, with a recording medium capable of being decoded by an image signal decoding device, the recording medium is recorded with a recording signal capable of being decoded by the decoding device, and a process for generating the recording signal comprising a dividing step and a coding step. The dividing step is for hierarchically dividing the inputted image signal into a plurality of frequency bands using sub-band transforms and generating a plurality of frequency band signals, with each frequency band signal comprising sub-band transform coefficients. The coding step is for coding the sub-band transform coefficients of said each frequency band signal using zero tree coding and run length coding.

DETAILED DESCRIPTION OF THE PREFERRED EMBODIMENTS

First Embodiment

The following is a description of an image signal coding method and device thereof, an image signal decoding method and device thereof (and a recording medium) according to the present invention. Basically, the present invention improves coding efficiency and isolation by coding a coefficient tree for sub-band transform coefficients or wavelet transform coefficients by effectively combining zero tree coding (hereinafter referred to as zero tree coding) and run length coding technology. Further, the number of bits used for expressing transform coefficients (isolation coefficients) can be reduced by removing unimportant transform coefficients without causing the signal to noise (hereinafter referred to as "S/N") ratio to hardly deteriorate at all. The number of bits used to express the chrominance component can also be reduced by carrying out identifications based on luminance components corresponding to un-valued chrominance components. In this embodiment, the present invention is applied to an image signal coding device and decoding device for performing sub-band coding on an inputted image signal using, for example, using wavelet transforms.

The image signal coding device and decoding device of the present invention separates the inputted image signal into a luminance component and a chrominance component and can be applied to either component. However, no distinction is made in the following description between luminance components and chrominance components, with all being referred to as inputted image signals.

Figure 1:
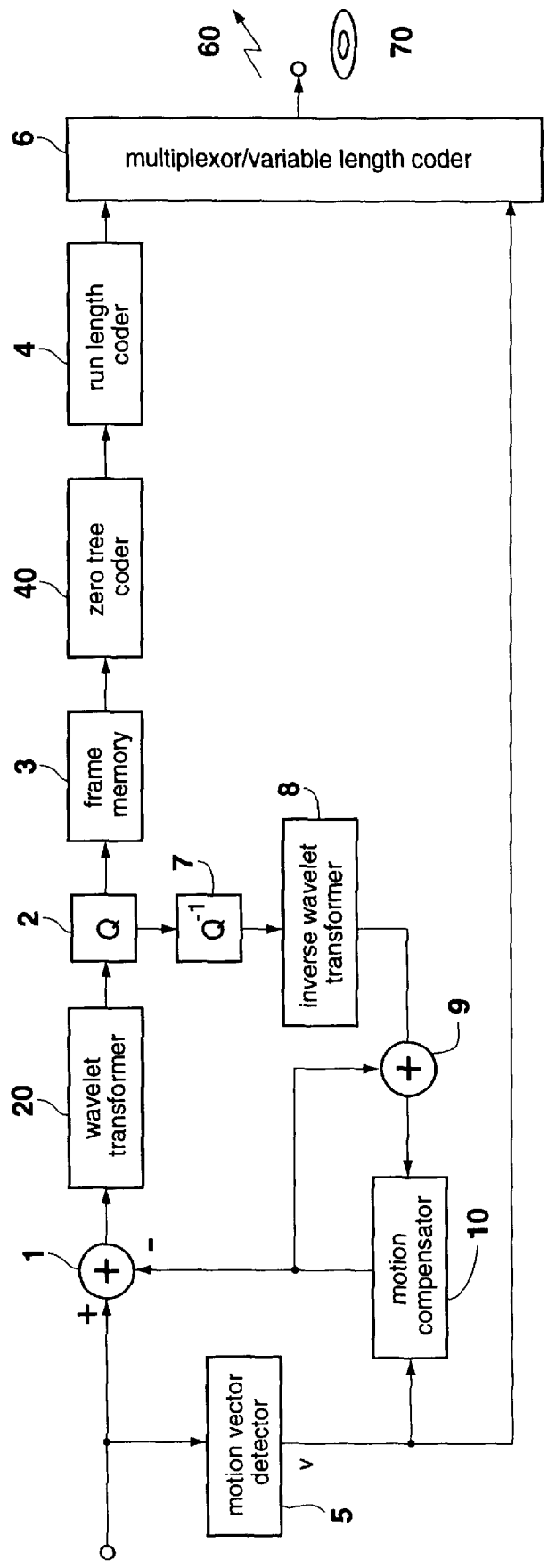
FIG. 1 is a block diagram showing a specific circuit configuration of an image signal coding device to which the present invention is applied.

FIG. 1 shows an image signal coding device according to the present invention. The inputted image signal is supplied to an input terminal and then supplied to an adder 1 and a motion vector detector 5. The adder 1 calculates the difference between the inputted image signal and an estimation reference image signal from a motion compensator 10 to be described later and generates and estimation error signal (inter estimation coding). At, for example, the time of a scene changeover when there is no time correlation between the estimation reference image signal and the inputted image signal or in order to eliminate the propagation of errors, a zero signal is supplied from the motion compensator 10 to the adder 1 at prescribed intervals of the inputted image signal. At this time, the adder 1 outputs the inputted image signal without modification (intra estimation coding).

The estimation error signal from the adder 1 is supplied to a wavelet transformer 20. The wavelet transformer 20 then divides the inputted estimation error signal into a plurality of frequency band signals (frequency band signals) comprising wavelets using wavelet transforms.

Figure 2:
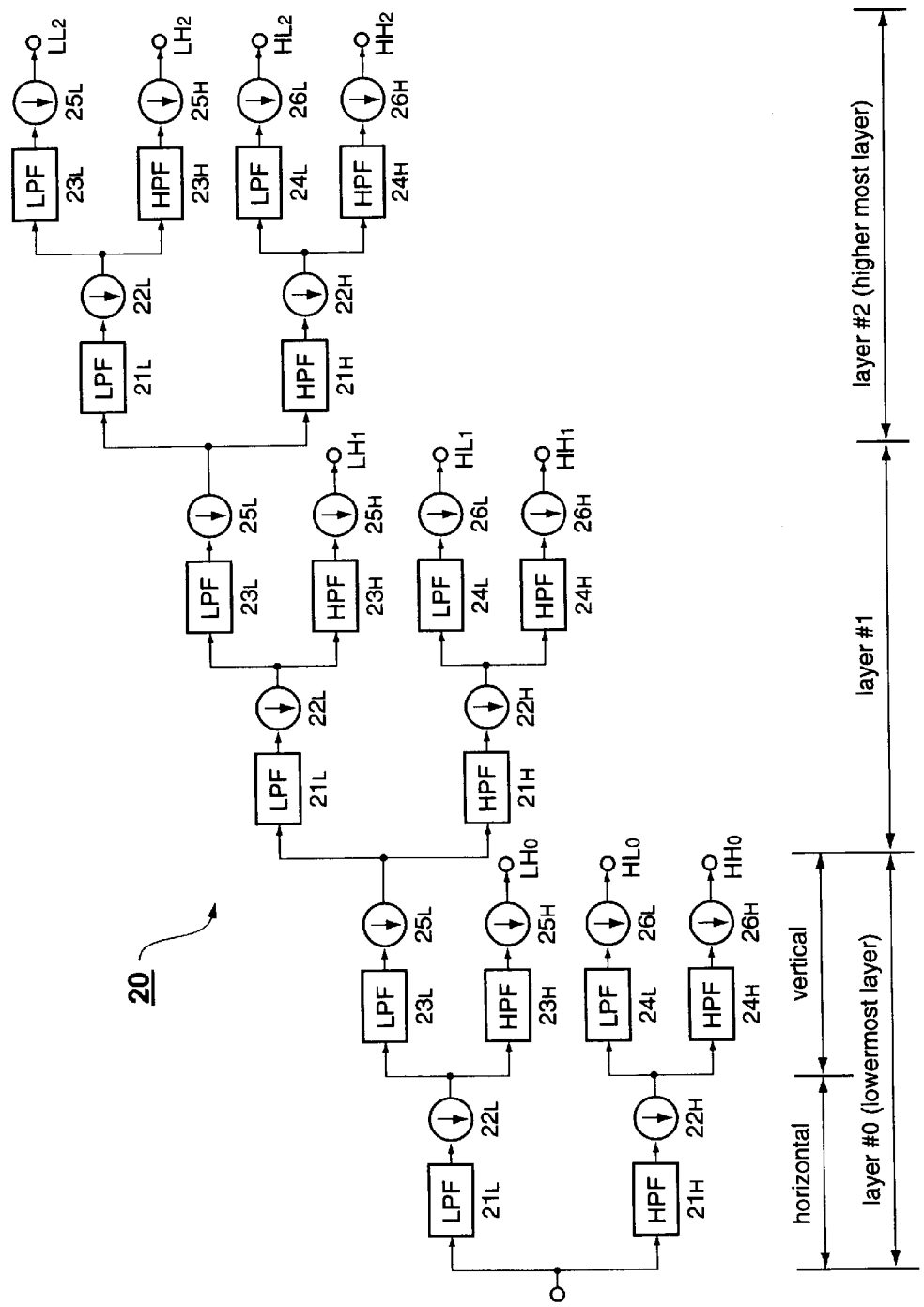
FIG. 2 is a block diagram showing a specific circuit configuration for a wavelet transformer 20 comprising the image signal coding device.

Next, a description will be given of the wavelet transformer 20. FIG. 2 shows an example configuration of the wavelet converter 20. This wavelet converter 20 is shown as, for example, a wavelet transformer for carrying out three stage band dividing. As shown in FIG. 2, the estimation error signal from adder 1 (inputted image signal at the time of intra estimation coding) is supplied to a low pass filter (hereinafter referred to as "LPF") 21L and a high pass filter (hereinafter referred to as "HPF") 21H for separating low frequency band signals and high frequency band signals, respectively, in the horizontal direction of the image via the input terminal.

The LPF 21L supplies the low frequency band signal occurring in the horizontal direction of the image from the inputted estimation error signal (inputted image signal when intra coding) to a downsampler 22L. The HPF 21 supplies the high-frequency band signal occurring in the horizontal direction of the image from the inputted estimation error signal (the inputted image signal when intra coding) to a downsampler 22H. The LPF 21L and the HPF 21H comprise, for example, FIR filters. For example, the LPF 21L can allow low frequency band signals present in the low frequency component of the image signal provided in the scanning order of the horizontal direction of the image to pass and supply these signals to the downsampler 22L, while the HPF 21H can allow high-frequency band signals present in the high-frequency component of the image signal to pass and provide these signals to the downsampler 22H.

The downsamplers 22L and 22H downsample the inputted frequency band signals and output the downsampled low frequency band signals and high frequency signals occurring in the horizontal direction. The downsamplers 22L and 22H thin out the low frequency band signals and the high frequency band signals every one sample in respect to the horizontal direction and the downsampled low frequency band signals and high frequency band signals occurring in the horizontal direction are supplied to and LPF 23L and HPF 23H and an LPF 24L and HPF 24H respectively.

The LPF 23L allows low frequency band signals occurring in the vertical direction of the image to pass from inputted downsampled low frequency band signals occurring in the horizontal direction and supplies these signals to a downsampler 25L. The HPF 23H allows high frequency band signals occurring in the vertical direction of the image to pass from inputted downsampled low frequency band signals occurring in the horizontal direction and provides these signals to a downsampler 25H. The LPF 24L allows low frequency band signals occurring in the vertical direction of the image to pass from inputted downsampled high frequency band component signals occurring in the horizontal direction and supplies these to a downsampler 26L. Further, the HPF 24H allows high frequency band signals occurring in the vertical direction of the image to pass from inputted downsampled high frequency band signals occurring in the horizontal direction and supplies these to a downsampler 26H.

The LPF 23L supplies low frequency band signals belonging to low frequency bands in both the horizontal direction and the vertical direction i.e. coefficients belonging to groups other than groups HL0, HH0 and LH0 of layer #0 (lowermost layer) shown in FIG. 2, for example, occurring at the wavelet transforms to the downsampler 25L. The HPF 23H supplies frequency band signals for which the horizontal direction belongs to the low frequency band and the vertical direction belongs to the high frequency band, i.e. coefficients of the group LH0 of layer #0 (lowermost layer) to the downsampler 25H. LPF 24L supplies frequency band signals for which the horizontal direction belongs to the high frequency band and for which the vertical direction belongs to the low frequency band i.e. coefficients belonging to group HL0 of layer #0 (lowermost layer) to a downsampler 26L. The HPF 24H supplies frequency band signals belonging to high frequency bands in both the horizontal and vertical directions i.e. coefficients belonging to groups HH0 of layer #0 (lowermost layer) to the downsampler 26H. The LPF 23L, HPF 23H, LPF 24L and the HPF 24H can comprise, for example, linear phase FIR filters.

The downsampler 25L downsamples frequency band signals belonging to low frequency bands of both the horizontal and vertical directions in the vertical direction and outputs low frequency band signal belonging to low frequency bands in both the downsampled in the horizontal and vertical directions. The downsampler 25H downsamples inputted frequency band signals for which the horizontal direction belongs to the low frequency band and for which the vertical direction belongs to the high frequency band and outputs a downsampled frequency band signal (LH0) having a horizontal direction belonging to the low frequency band and a vertical direction belonging to the high frequency band.

Further, the downsampler 26L downsamples inputted frequency band signals having a horizontal direction belonging to the high frequency band and a vertical direction belonging to the low frequency band in the vertical direction and outputs a downsampled frequency band signal (HL0) having a horizontal direction belonging to the high frequency band and a vertical direction belonging to the low frequency band. Moreover, the downsampler 26H downsamples an inputted signal having a high frequency band in both the horizontal and vertical directions in the vertical direction and output a downsampled high frequency band signals (HH0) having both horizontal directions and vertical directions belonging to the high frequency band.

The low frequency band signal from the downsampler 25L is supplied to LPF 21L and HPF 21H of the second stage (layer #1). Each of the frequency signals LH0, HL0 and HH0 from the downsamplers 25H, 26L and 26H are outputted as a part of the output signal for the wavelet transformer 20.

The filters LPF 21L, 23L and 24L, HPF 21H, 23H and 24H, and downsamplers 22L, 22H, 25L, 25H, 26L and 26H of the second (layer #1) and third (layer #2: uppermost level) stages band-divide the low frequency band signals belonging to the low frequency band in both the horizontal and vertical directions provided from the previous stage downsampler 25L into four groups in the same way as for the aforementioned first stage (layer #0: lowermost layer). The operation of the LPF 21L, 23L and 24L, the HPF 21H, 23H and 24H, and the downsamplers 22L, 22H, 25L, 25H, 26L and 26H of the second (layer #1) and third (layer #2: the uppermost level) stages are the same as the operation of each part of the first stage and as such are given the same numerals. A detailed description of these parts will therefore be omitted.

The frequency band signals LL2, LH2, HL2, HH2, LH1, HL1, HH1, LH0, HL0 and HH0 for each of the frequency bands comprising the wavelet transform coefficients supplied from the first stage (layer #0: lowermost level) downsamplers 26H, 26L and 25H, the second stage (level #1) downsamplers 26H, 26L and 25H, and the third level (layer #2: uppermost level) downsamplers 26H, 26L, 25H and 25L, respectively are then outputted as the output signal for the wavelet transformer 20.

Each of the frequency band signals from the wavelet transformer 20 are supplied to a quantizer 2. The quantizer 2 then generates a quantized plurality of frequency band signals comprising quantized coefficients by quantizing the wavelet transform coefficients of each of the inputted frequency band signals.

Namely, the quantizer 2 quantizes wavelet transform coefficients belonging to groups HH0, HL0 and LH0 of layer #0 (lowermost layer), wavelet transform coefficients belonging to groups HH1, HL1 and LH1 of layer #1 and wavelet transform coefficients belonging to groups HH2, HL2, LH2 and LL2 of layer #2 using a quantization step (scale), for example, smaller than that for a higher order level and supplies the quantization coefficients obtained to the frame memory 3. Making the quantization step (scale) smaller than that for higher order layers is merely an example for this embodiment, however, and other quantization methods are possible.

Each of the quantization coefficients of the quantized plurality of frequency band signals are supplied to the frame memory 3 to be stored at a prescribed address. The frame memory 3 then generates a coefficient tree comprising a plurality of sub-trees by picking out quantization coefficients existing at spatially the same space at each hierarchy obtained by carrying out band dividing on each of the quantization coefficients of the lowest frequency band (belonging to the group LL2 of the second layer #2). Each sub-tree comprises a quantization coefficient string (hereinafter referred to as a scan string) obtained by S-scanning the quantization coefficients in a direction from the uppermost level (lowest frequency band) to the lowermost level (highest frequency band). A plurality of sutures (in this case, three coefficient trees) corresponding to each of the quantization coefficients and quantization coefficients of the low frequency band (belonging to group LL2 of layer #2) are then outputted.

Figure 3A:
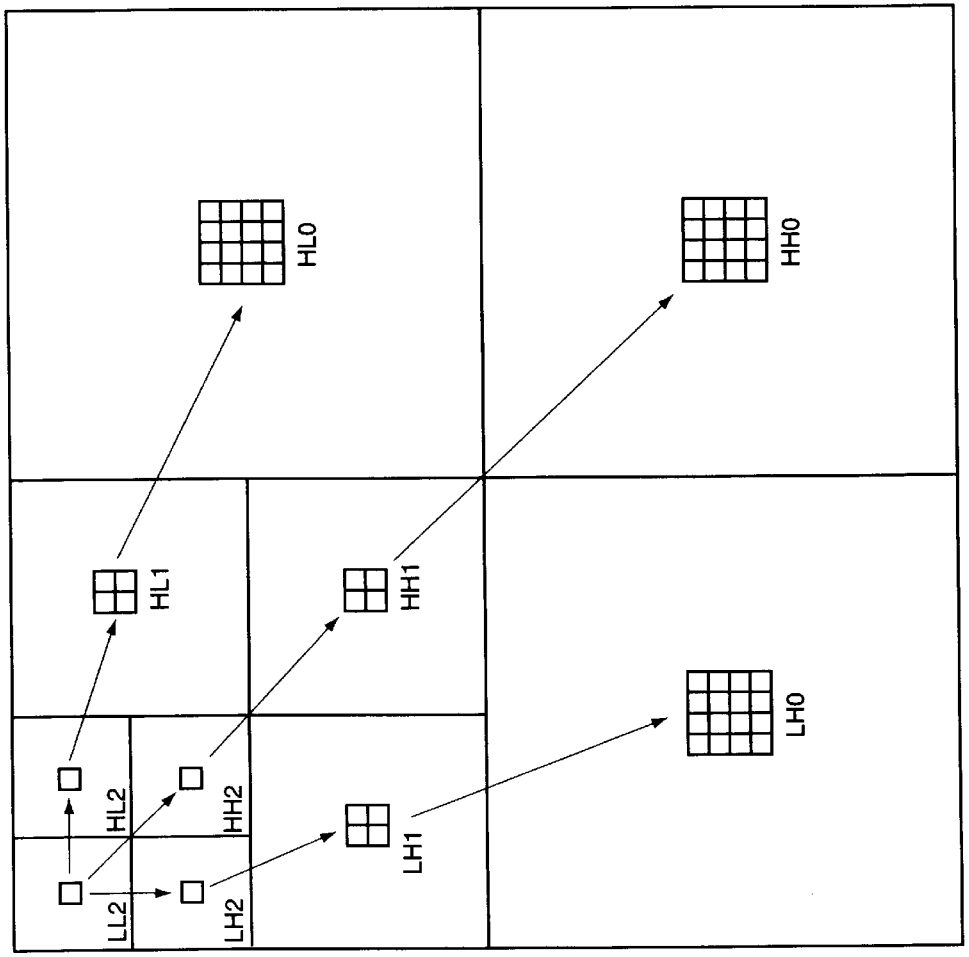
FIG. 3A and FIG. 3B are views showing the arrangement of transform coefficients occurring at the three layer wavelet transforms.
Figure 3B:
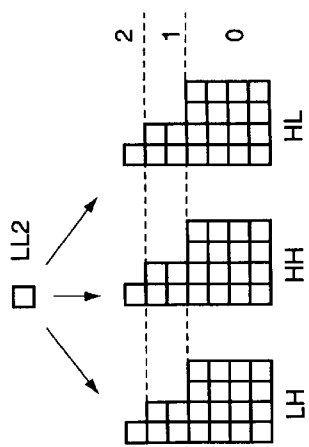
Figure 4:
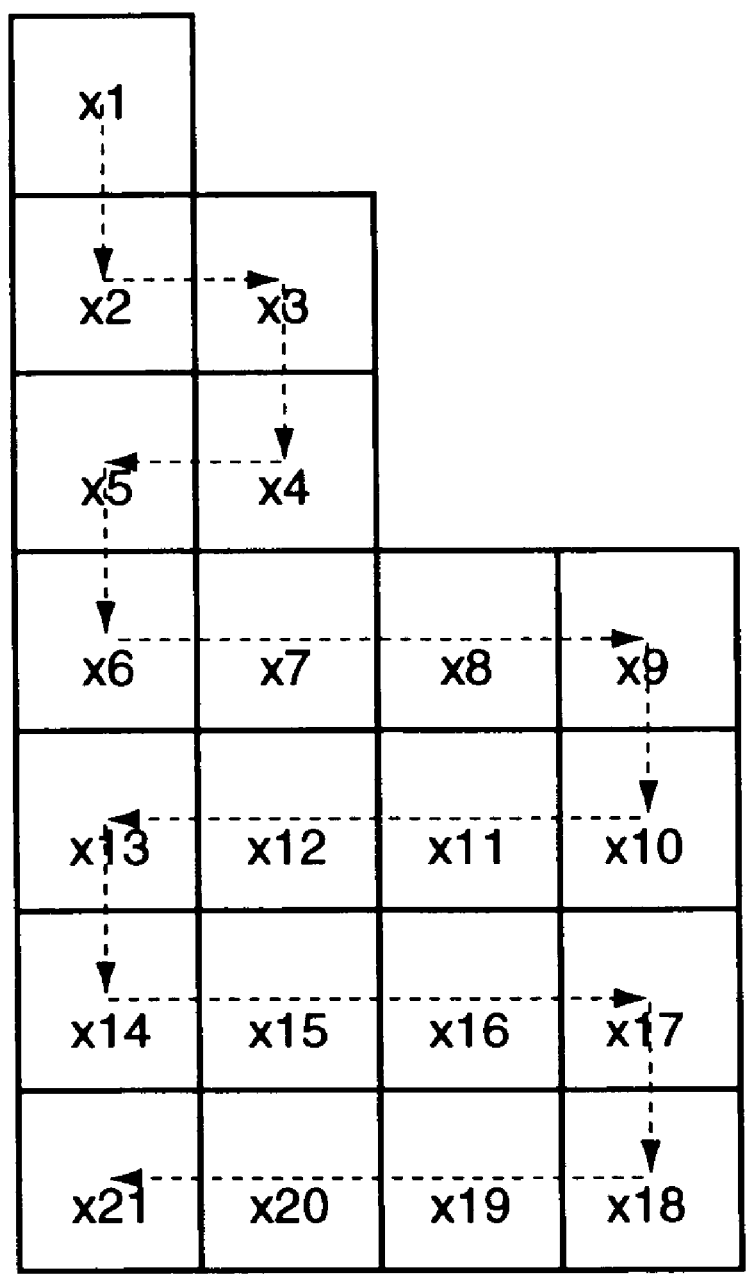
FIG. 4 is a view showing the sub-tree scan sequence.

This is to say that the frame memory 3 stores, for example, one frame portion of quantization coefficients provided from the quantizer 2 so as to form a matrix layered in order from the upper left to the lower right as shown, for example, in FIGS. 3A and 3B. After this, the frame memory 3 then picks out quantization coefficients (FIG. 3A) existing in positions that are spatially the same for each of the hierarchies corresponding to each of the quantization coefficients of the lowermost frequency band (belonging to group LL2 of layer #2) and then generates a coefficient tree (FIG. 3B). Sub-trees comprising quantization coefficients occurring at the same frequency bands (in HL, the groups HL2, HL1 and HL0, in LH, the groups LH2, LH1 and LH0, and in HH, the groups HH2, HH1 and HH0) are also generated while the coefficient tree is being generated. As can be seen in FIGS. 3A and 3B, the quantization coefficients belonging to the groups HL2, HL1 and HL0 are formed as the same sub-tree, the quantization coefficients belonging to the groups HH2, HH1 and HH0 are formed as the same sub-tree and the quantization coefficients belonging to the groups LH2, LH1 and LH0 belong to the same sub-tree. S-scanning is then carried out so as to read-out the quantization coefficients x1, x2, x3, x4, . . . in the way shown in FIG. 4 in such a manner that neighboring coefficients within the same frequency band continue on from each other in a direction from the uppermost level (low frequency band) to the lowermost level high frequency band) of each sub-tree. Sub-trees comprising quantization coefficients for the lowermost frequency band (belonging to the group for LL2 of the uppermost layer (layer #2)) and S-scanned quantization coefficient strings (hereinafter referred to as a scan string) corresponding to these quantization coefficients are then provided to the zero tree coder 40. The order of the S-scan is by no means limited to the aforementioned specific example, and any order where neighboring quantization coefficients of quantization coefficients belonging to the same frequency band carry on from each other is possible. For example, an S-scan where quantization coefficients belonging to group HL1 of layer #1 become quantization coefficients x2, x5, x4 and x3. Further, the scan direction can be changed every group.

The sub-tree for the scan string comprising quantization coefficients for the lowermost frequency band (belonging to the LL2 group of the uppermost layer (layer #2)) and quantization coefficients corresponding to these quantization coefficients is supplied to a zero tree coder 40. When the quantization coefficients of the low frequency band occurring in this tree structure are un-valued, the zero tree coder 40 utilizes the fact that the likelihood of quantization coefficients of high frequency bands existing in spatially the same position with respect to these quantization coefficients will also be un-valued and codes quantization coefficients using zero tree technology. Namely, a determination is made as to whether or not the quantization coefficients of the lowermost frequency band (belonging to the group LL2 of the uppermost layer (layer #2)) and the quantization coefficients of three sub-trees existing at the same position spatially corresponding to these quantization coefficients are un-valued. The quantization coefficients of the lowermost frequency band are then coded by allotting symbols to the quantization coefficients of the lowermost frequency band (belonging to the group LL2 of the lowermost layer (layer #2)) in response to these determination results. These symbols indicate whether or not the three sub-trees comprising the quantization coefficients existing in spatially the same position corresponding to the quantization coefficients for the lowermost frequency band are to be transmitted.

Basically, when valued coefficients exist within the sub-tree quantization coefficients, the symbols "value" and this quantization coefficient are allotted to the low frequency band quantization coefficients and the sub-tree quantization coefficients corresponding to these quantization coefficients are transmitted. Further, when all of the quantization coefficients of the sub-tree are coefficients that do nothing and the quantization coefficients of the lowermost frequency band are valued coefficients, the symbols "valued_zero_tree_root" and the quantization coefficients are allotted to the quantization coefficients of the low frequency band and the sub-tree quantization coefficients corresponding to the quantization coefficients are not transmitted. Moreover, when all of the sub-tree quantization coefficients are not valued coefficients and the low frequency band quantization coefficients are also not valued, the symbols "zero_tree_root" are only allotted to the low frequency band quantization coefficients and the sub-tree quantization coefficients corresponding to these quantization coefficients are not transmitted. Low frequency band quantization coefficients coded in this way, symbols and sub-tree quantization coefficients corresponding to these quantization coefficients that have to be transmitted are supplied to the run length coder 4. In the case of coding within a frame (intra estimation coding), just two symbols, i.e. "value and" "valued_zero_tree_root can be prepared for use because lowermost frequency band coefficients are rarely un-valued.

The sub-tree quantization coefficients of the coded low frequency band quantization coefficients, symbols and the sub-tree quantization coefficients corresponding to these quantization coefficients that have to be transmitted supplied to the run length coder 4 are run length coded in this scan string order. Namely, the three sub-trees starting from the quantization coefficients for groups of frequency bands HL2, LH2 and HH2 other than these low frequency bands are coded using run length coding in accordance with the aforementioned S-scan string.

A description will now be given of a coefficient tree coding algorithm i.e. an algorithm for zero tree coding of low frequency band coefficients and run length coding of sub-trees. First, each of the quantization coefficients occurring at the low frequency band (group for LL2) are defined as "a". Each of the scan strings (sub-trees) starting from the groups for HL2, LH2 and HH2 corresponding to each of the quantization coefficients a are checked and symbols for the coefficient trees for each of the coefficients a are decided. The symbol deciding and coding method is described in accordance with the flowchart shown in FIG. 5. In this flowchart, the operation of the zero tree coding and the run length coding (dotted line portions) to be described later is described in order to make the coding easier to understand.

Further, in step 1, a determination is made as to whether or not the absolute value XXX X XXX of at least one of all of the quantization coefficients X is greater than a predetermined threshold value. i.e. a determination is made as to whether or not there are valued coefficients within the sub-tree quantization coefficients. When the result of this determination is YES, i.e. when at least one quantization coefficient is a valued coefficient, step 2 is proceeded to and coding is carried out by allotting the symbols "value" and this quantization coefficient to the quantization coefficients of the lowermost frequency bands (LL2). Step 3 is then proceeded to, the quantization coefficients for the three sub-trees corresponding to the quantization coefficients a of this low frequency band (LL2) are encoded using run length coding to be described later, and the coding (zero tree coding and run length coding) process is complete.

On the other hand, when the result of the determination in step 1 is NO, i.e. when all of the quantization coefficients are not of value, step 4 is then proceeded to and a determination is made as to whether or not the quantization coefficient a for the low frequency band (LL2) is larger than a pre-decided threshold value T, i.e. a determination is made as to whether or not there are any valued coefficients present in the quantization coefficient a for the lowermost frequency band. If the result of this determination is YES, i.e. if it is determined that there are valued quantization coefficients present in the quantization coefficient a for the lowermost frequency band (LL2), step 5 is then proceeded to and coding is carried out by allotting the symbols "valued_zero_tree_root" and this quantization coefficient to the quantization coefficient a for the lowermost frequency band (LL2). The coding (zero tree coding) process is then complete.

On the other hand, when the result of the determination in step 4 is NO, i.e. when the quantization coefficient a of the lowermost frequency band (LL2) is an un-valued coefficient, step 6 is proceeded to, and coding is performed by allotting symbols zero_tree_root to the quantization coefficient a of the lowermost frequency band (LL2). The code (zero tree code) processing is then complete.

Figure 5:
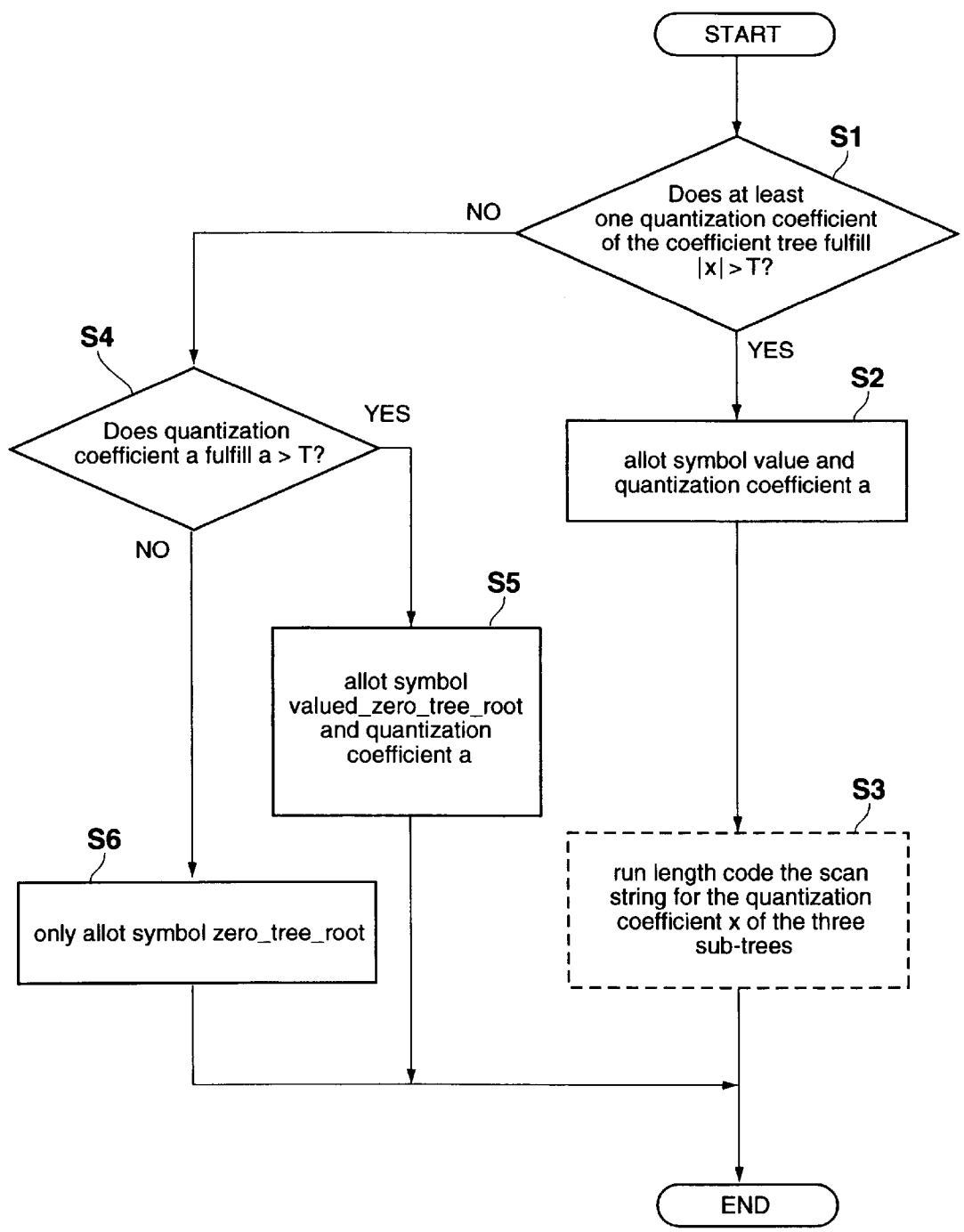
FIG. 5 is a flowchart illustrating the coding operation of a zero tree coder and a run length coder comprising the image signal coding device of the present invention.
Figure 6:
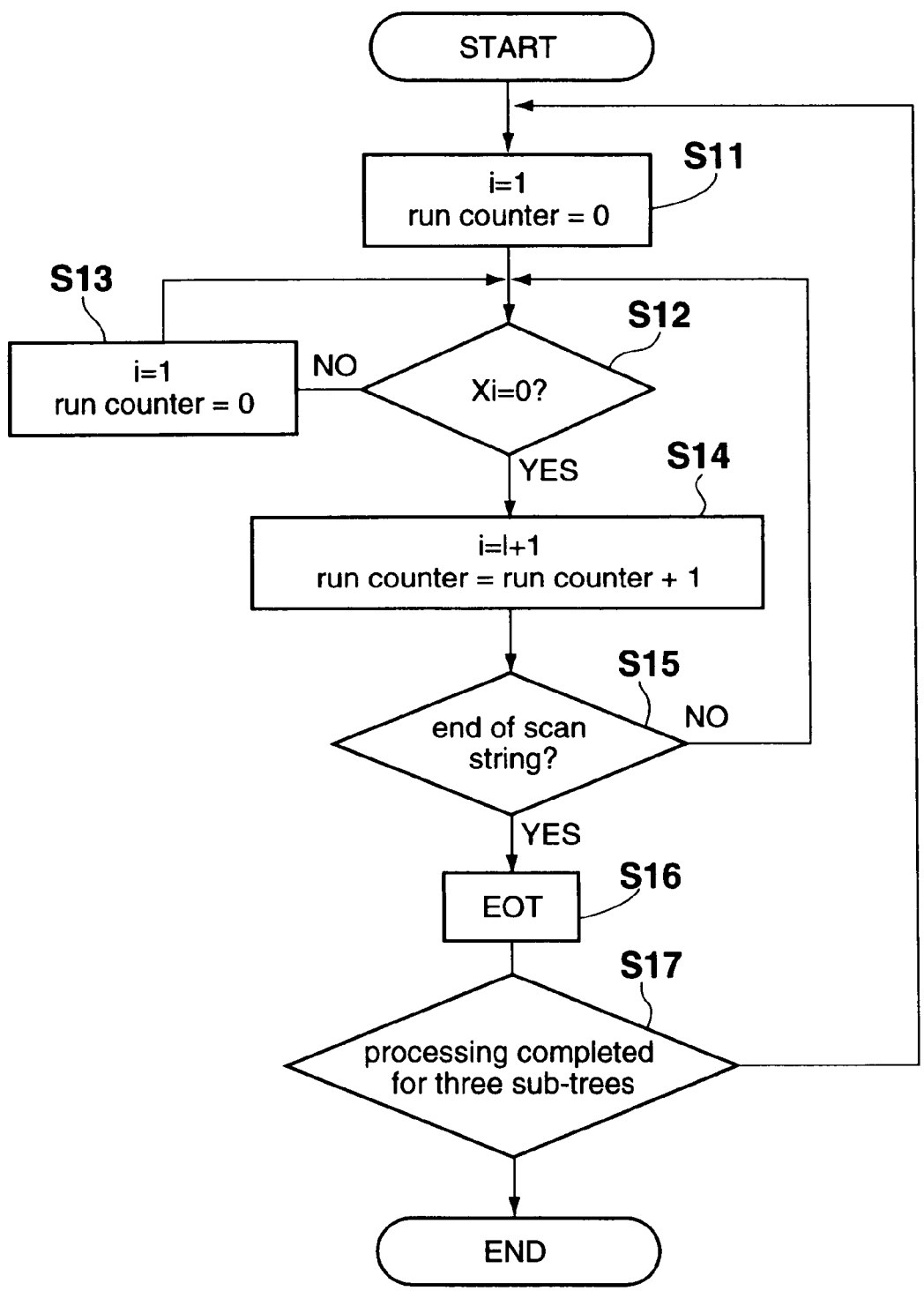
FIG. 6 is a flowchart illustrating the detailed operation at the time of scanning and run length coding sub-coefficient trees of the run length coder comprising the image signal coding device of the present invention.

Next, the algorithm for coding of the three sub-trees using the run length coding of step 3 of FIG. 5 will be described. This is carried out using , for example, a register (with a value hereinafter taken to be "i"), etc., showing a run counter and quantization coefficient order. The method for coding the scan string coefficients x1, x2, x3, . . xn (where x1 is the quantization coefficient for the groups HL2, LH2 and HH2, and xn is the coefficient for the lowermost layer (layer #0)) using run length coding is described in accordance with the flowchart shown in FIG. 6, where xi (i=1 to n) is represents the quantization coefficient.

In step S11, the register value i (i=1 to n) and the run counter are initialized, i.e. i is set to "1" and the run counter is set to "0". Step S12 is then proceeded to.

In step S12, a determination is made as to whether or not the quantization coefficient xi is a valued coefficient. If the result of this determination is YES, i.e. when the quantization coefficient xi is a valued coefficient, step S14 is proceeded to. If the result of this determination is NO, i.e. if the quantization coefficient xi is not a valued coefficient, step S13 is proceeded to. Here, as described above, the scan string quantization coefficient x1 is the coefficient for the uppermost level and the quantization coefficient xn is the coefficient for the lowermost level.

In step S14, i is updated to i+1 and the run counter is updated to run counter +1 before moving on to step S15. In step S13 on the other hand, step S12 is returned to after updating i to 1 and the run counter to 0. In step S15 a determination is made as to whether or not the quantization coefficient is the final valued quantization coefficient of the scan string. When the result of this determination is NO, i.e. when further sub-tree valued quantization coefficients exist, step S12 is returned to and the same processing is executed for the following quantization coefficient. When the determination result is YES, i.e. when the quantization coefficient is the final valued quantization coefficient of the sub-tree, step S16 is proceeded to.

An end of tree (EOT) code indicating the end of the sub-tree is then generated in step S16 and step 17 is proceeded to.

A determination is then made in step S17 as to whether or not all of the sub-trees (i.e. the three sub-trees) for the lowermost frequency band quantization coefficient currently being processed have been coded. When the determination result is NO, i.e. when all of the sub-trees (the three sub-trees) have not yet been processed, step 1 is returned to and run length coding is carried out on the quantization coefficients for the sub-trees that have not yet been processed. When the result of the determination is YES, i.e. when all of the sub-trees (the three sub-trees) have been processed, run length coding for the sub-trees is complete.

The coded data generated by the zero tree coding for the quantization coefficients belonging to the low frequency bands (LL2) and the run length coding for each of the sub-tree quantization coefficients is supplied to the variable length coder/multiplexor 6. i.e. the zero tree run length coder 4 supplies symbols and quantized valued coefficients for the lowermost frequency bands for each of the sub-trees corresponding to the lowermost frequency band obtained in the way described above, valued coefficients for each of the sub-trees, counter flag values displaying the number of consecutive un-valued coefficients and the EOT to the variable length coder/multiplexor 6.

The reason for applying run length coding to sub-trees in this way will now be described. Neighboring coefficients occurring in sub-band/wavelet transforms within the same frequency band have a high degree of correlation. For example, when a certain coefficient is not valued, the possibility of the neighboring coefficient also being not valued is high. Further, run length coding is effective when the same symbol continues for a long time. The run length coder 4 is therefore capable of catching the correlation between coefficients within the same frequency band by S-scanning the quantization coefficients in the way described above. The quantization coefficients can therefore be coded in an efficient manner.

On the other hand, the motion vector detector 5 compares the inputted image signal and an already inputted reference signal using, for example, so-called block matching, detects a motion vector V and supplies this motion vector V to the motion compensator 10 and the variable length coder/multiplexor 6.

The variable length coder/multiplexor 6 codes the code data (symbols and quantized valued coefficients for each of the lowermost frequency bands and the quantized valued coefficients xi for each sub-tree, the run count value (run number) and the EOT) provided from the run length coder 4 and the motion vector V provided from the motion vector detector 5 using a coding method of a high compression efficiency such as, for example, Hoffman coding, Variable Length Coding (VLC) or arithmetic coding [4]. The coded bitstream obtained is then transmitted to a recording medium (not shown in the drawings) such as a transmission path 11 such as broadcast system or network system, tape, disc, or semiconductor memory.

Further, the de-quantizer 7 inverse wavelet transformer 8 adder 9 and motion compensator 10 comprise a so-called "local decoder" for the estimation coding.

Namely, a quantized plurality of frequency band signals comprising quantization coefficients are supplied to the de-quantizer 7 from the quantizer 2. The de-quantizer 7 de-quantizes the supplied quantized coefficients, generates wavelet transform coefficients corresponding to the output of the wavelet transformer 20 and supplies each of the frequency band signals comprising wavelet transform coefficients to the inverse wavelet transformer 8. The inverse wavelet transformer 8 inverse wavelet transforms the supplied waveform transform coefficients, generates an estimation error signal (in the case of intra estimation coding this is the inputted image signal) corresponding to the output of the adder 1 and supplies this estimation error signal (or inputted image signal) to the adder 9. The adder 9 adds the estimation reference image signal from the motion compensator 10 supplied to the adder 1 and the estimation error signal from the inverse wavelet transformer 8, generates an image signal corresponding to the input of the adder 1 and supplies this image signal to the motion compensator 10 as an estimation image signal to be stored in frame memory not shown in the drawings. When the inputted image signal is that supplied in the case of intra estimation coding, this inputted image signal is supplied without modification from the adder 9 to the motion compensator 10 as the estimation image signal. After temporarily storing this estimation error signal in frame memory not shown in the drawings, the motion compensator 10 motion compensates and reads the estimation error signal stored in frame memory based on the motion vector V supplied from the motion vector detector 5 while the image signal for the following frame is being estimation coded. This motion compensated estimation image signal is then supplied to the adder 1 as the kind of estimation image reference signal described above. As the configuration of this local decoder is approximately the same as that of an image signal decoding device to be described later, a detailed description of the inverse wavelet transformer 8 etc. will be omitted. As becomes clear from the above description, zero tree coding is used for the coefficient trees for the sub-band/wavelet transform coefficients of the lowermost frequency bands and run length coding is used for each of the sub-trees of the sub-band/wavelet transforms in the image signal coding device to which the present invention is applied. However, when the lowermost frequency band sub-band/wavelet transform coefficients are not valued coefficients, there is a high possibility that sub-tree transform coefficients for these transform coefficients are also un-valued coefficients.

When all of the quantization coefficients of the coefficient tree are un-valued coefficients, one code is allotted to this tree. Further, the likelihood of obtaining an un-valued coefficient or a transform coefficient of value zero for the sub-tree quantization coefficients increases in the direction form the uppermost layer to the lowermost layer. Further, as described above, the scan order of quantization coefficients occurring in the run length coding starts from the uppermost layer of the sub-tree and only a run counter value showing the number (run number) of consecutive un-valued coefficients and an EOT code are transmitted. The efficiency with which coefficients are quantized can therefore be improved and the amount of data transmitted can be dramatically reduced in comparison to related coding by combining zero tree coding and run length coding in this way and coding the sub-band/wavelet transform coefficients.

A further example configuration for carrying out zero tree coding using lowermost frequency band quantization coefficients and run length coding using sub-tree quantization coefficients will now be described.

In the above embodiment, the quantization coefficients of the lowermost frequency band are zero tree coded one at a time and each of the sub-tree quantization coefficients corresponding to the quantization coefficients for the lowermost frequency band are run length coded one tree at a time. However, as described above, there is a high degree of correlation between neighboring coefficients of wavelet transform coefficients within the same frequency band. While the quantization coefficients for the lowermost frequency band are zero tree coded, the neighboring plurality of quantization coefficients are coded once. The correlation of neighboring sub-trees can then be captured by run length coding one scan with respect to the plurality of sub-tree quantization coefficients corresponding to the plurality of quantization coefficients of the lowermost frequency band. Coding of a higher compression rate can therefore be carried out as a result.

Figure 7B:
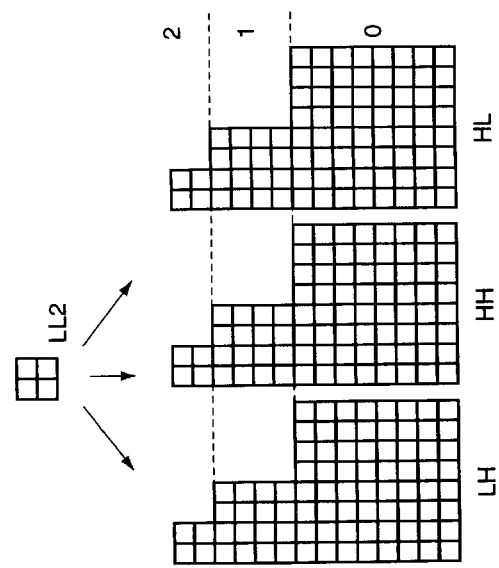
FIG. 7A and FIG. 7B are views showing the arrangement of the plurality of sub-trees comprising neighboring coefficients occurring in a further embodiment of the present invention.
Figure 7A:
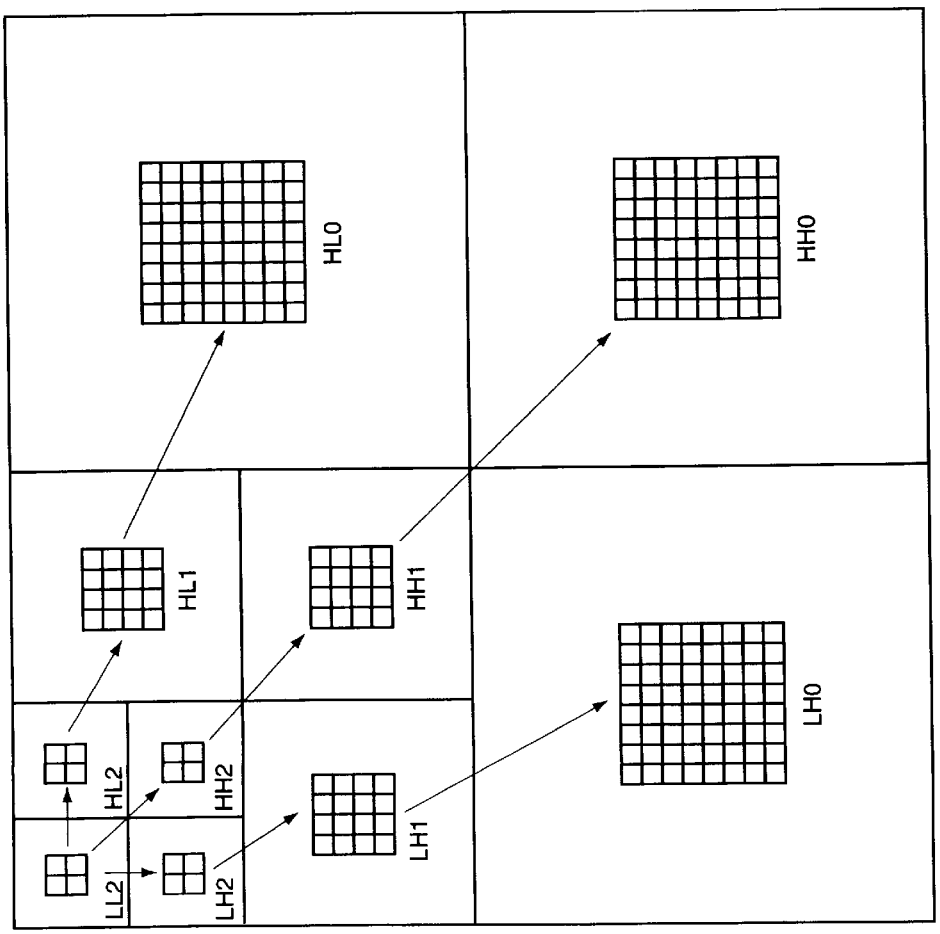
Figure 8:
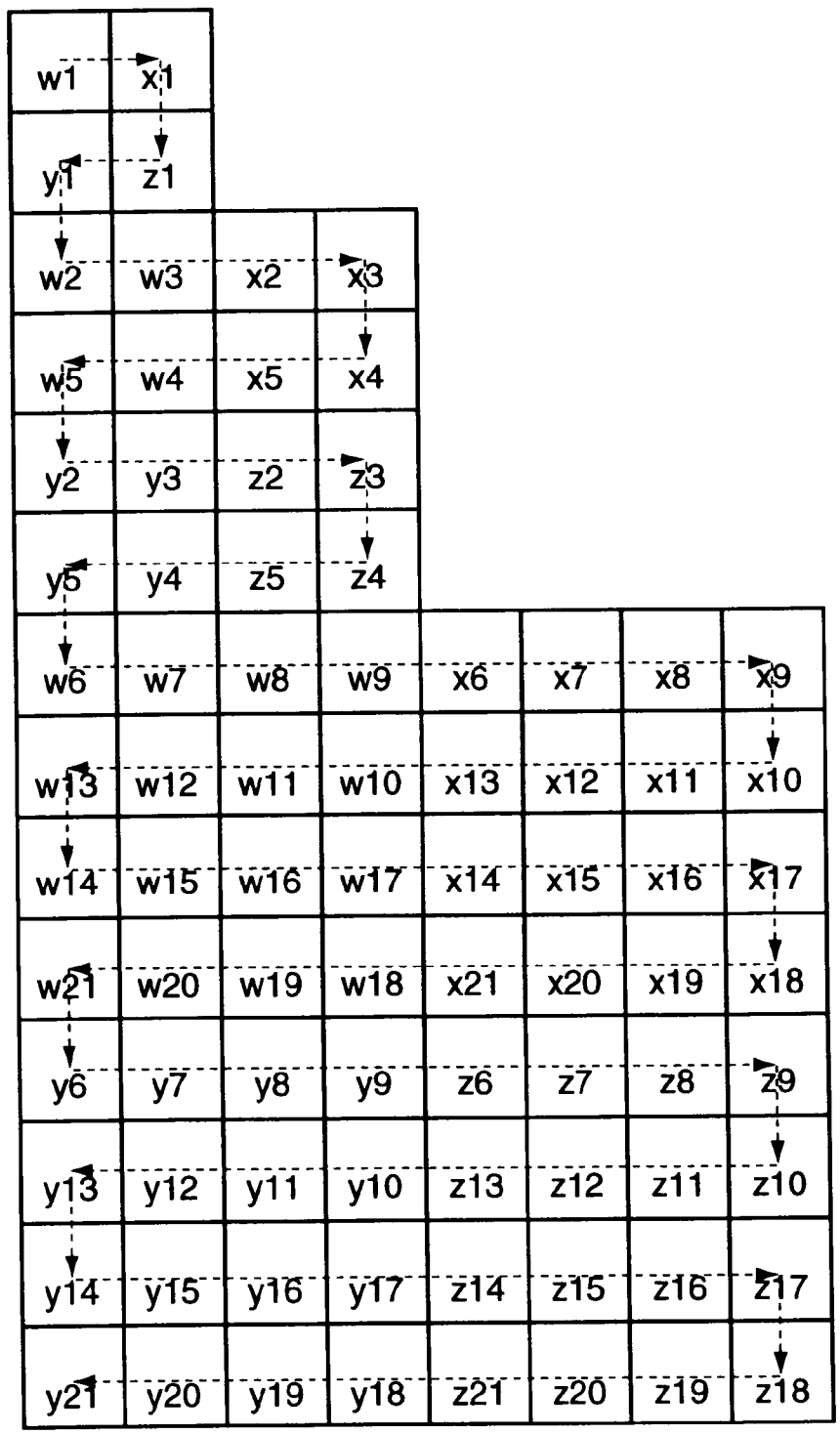
FIG. 8 is a view showing the order of scanning a plurality of sub-trees occurring in the further embodiment of the present invention.
Figure 9:
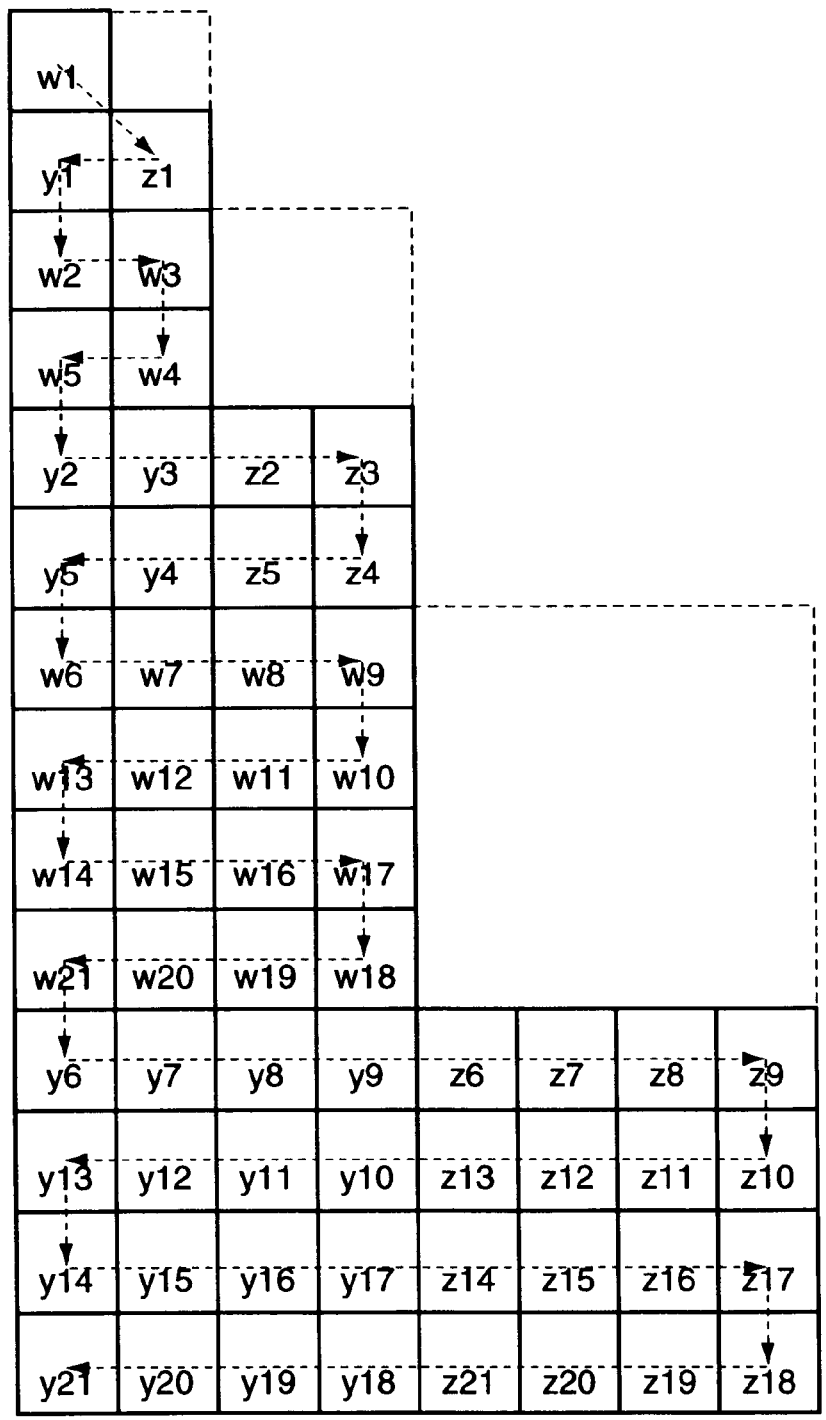
FIG. 9 is a view showing the order of scanning a further plurality of sub-trees for a further embodiment of the present invention.

A specific example of this is described using FIGS. 7A and 7B. In FIGS. 7A and 7B, after four lowermost frequency band quantization coefficients have been zero tree coded, coefficients of each of the layers existing at the same position spatially as the quantization coefficients of the four lowermost frequency bands are read every frequency band (the groups HL, HH and LH) and a coefficient tree is generated every each frequency band. Namely, four neighboring quantization coefficients belonging to the group of lowermost frequency band LL2 are selected and the aforementioned zero tree coding is carried out on each of the selected quantization coefficients. Quantization coefficients of each layer existing at the same position spatially as the four coded quantization coefficients are pulled out (FIG. 7A) following from the uppermost layer to the lowermost layer every each frequency band (groups HL, LH and HH) and a sub-tree comprising the four neighboring quantization coefficients is generated (FIG. 7B). Specifically, each of the frequency band sub-trees corresponding to the four quantization coefficients of the lowermost frequency band are generated as follows. For example, as shown in FIG. 7B and FIG. 8, first, the sub-trees corresponding to the respective four quantization coefficients of the lowermost frequency band i.e. the sub-tree comprising quantization coefficients w1, w2, w3, w4 . . . , the sub-tree comprising quantization coefficients x1, x2, x3, x4 . . . , the sub-tree comprising quantization coefficients y1, y2, y3, y4, . . . , and the sub-tree comprising quantization coefficients z1, z2, z3, z4 . . . are generated for each frequency band. The quantization coefficients within the four neighboring sub-trees are then S-scanned and read so that neighboring coefficients in the direction from the uppermost layer to the lowermost layer follow on from each other, i.e. so as to become quantization coefficients w1, x1, z1, y1, w2, w3, x2, x3, x4 . . . as shown in FIG. 8. The scan string for the S-scanned quantization coefficients are then supplied to a zero tree coder 40. Zero tree coding the then carried out on the four quantization coefficients of the lowermost frequency band. As a result, when a certain quantization coefficient is an un-valued coefficient, the likelihood of the coefficient next to this coefficient also being an un-valued coefficient is high. The quantization coefficients can then be coded at a higher compression rate by run length coding the plurality of sub-trees comprising neighboring quantization coefficients at the same time. However, when the quantization coefficients occurring at the lowermost frequency band are coded by symbol zero_tree_root or symbol valued_zero_tree_root using zero tree coding, sub-trees corresponding to these quantization coefficients do not exist. However, as shown in FIG. 9, scanning is carried out by skipping (skip scan) portions corresponding to non-existent sub-trees (in this case, sub-trees of quantization coefficient x1, x2, . . . ) because the existence or absence of a sub-tree can be understood from symbols allotted by zero tree coding of quantization coefficients for lowermost frequency bands that has already finished. In the case of this embodiment, the quantization coefficient taken as the skip scan string in the case of outputting from the zero tree coder 40 can be outputted or the quantization coefficients inputted at the run length coder 4 can be skip scanned. Further, a frame memory can be provided between the zero tree coder 40 and the run length coder 4 and skip scanning can be performed at the time of reading and writing to or from frame memory.

When the aforementioned skip string of consecutive un-valued coefficients is long, coding can be carried out in an efficient manner. However, when isolated valued coefficients are wedged in at the string for the un-valued coefficients of the remaining scan string, a large amount of data is required to code this skip string. However, the un-valued coefficients can be made to be consecutive and the coding efficiency can be improved by replacing these isolated valued coefficients with un-valued coefficients based on a prescribed reference. A detailed description of run length coding when isolated valued coefficients exist in the non-valued coefficient string will now be given.

Figure 10:
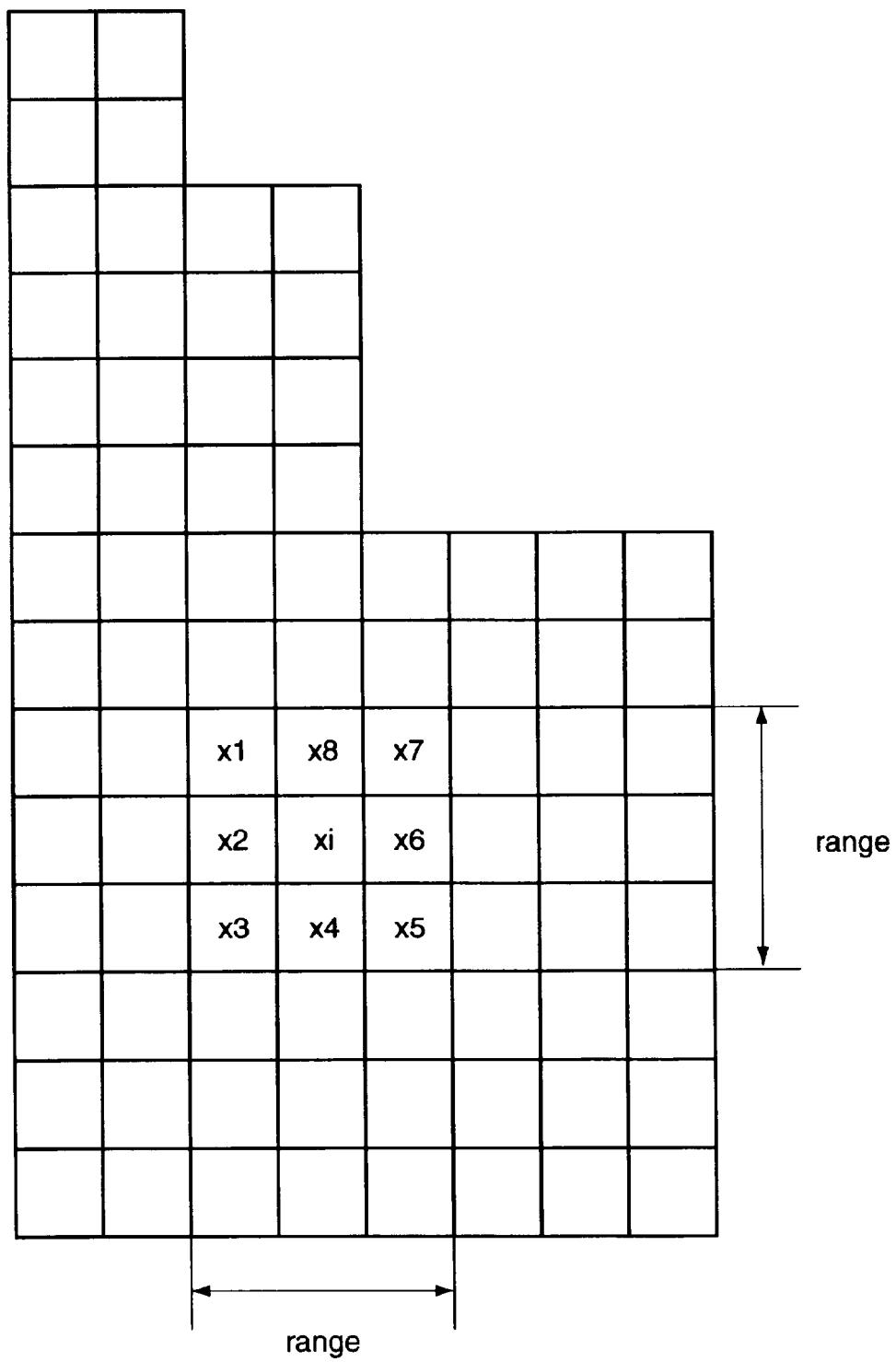
FIG. 10 is a view showing isolated coefficients within sub-trees of the present invention.

The belonging of this isolated coefficient to the lowermost layer can be taken as a reference for determining a an isolated valued coefficient to be an un-valued coefficient and when this value is small, this isolated coefficient can be considered to be a non-valued coefficient. Namely, the essence of the picture quality of the coded picture is not effected and this can therefore be discarded. When N or more of neighboring quantization coefficients (in this case, the 8 neighboring quantization coefficients x1 to x8) within the plus/minus range occurring in both the horizontal and vertical directions with respect to the quantization xi are un-valued coefficients, as shown in, for example, FIG. 10, the run length coder 4 decides for this quantization coefficient to be an isolated coefficient when the value for the quantization coefficient xi is smaller than a prescribed threshold value Ti and this quantization coefficient is assumed to be an un-valued coefficient.

Figure 11:
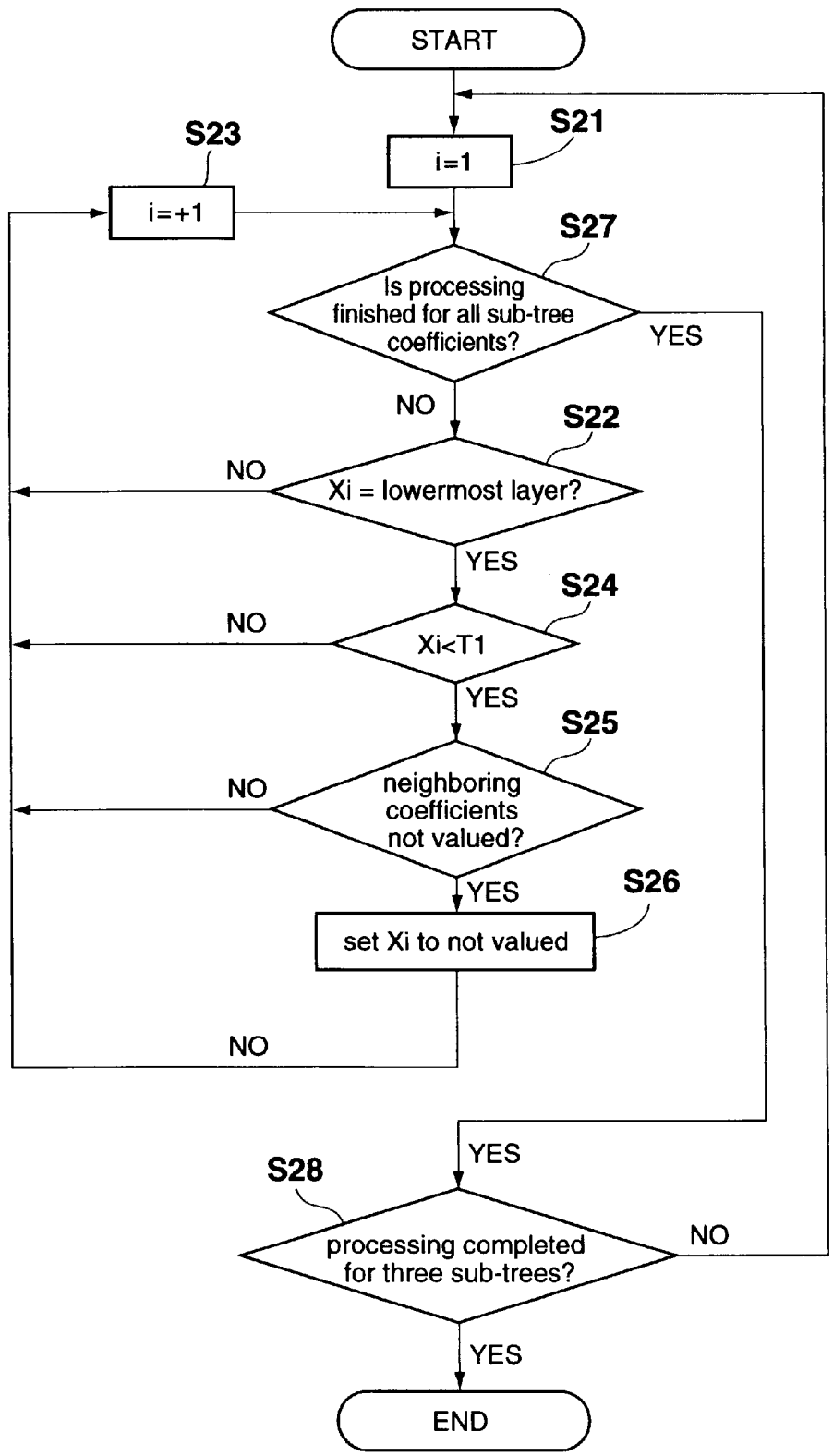
FIG. 11 is a flowchart illustrating the operation when isolated coefficients within sub-trees are taken as un-valued coefficients in the present invention.

The following is a description of an algorithm for detecting these isolated coefficients. In this embodiment, at the run length coder 4, sub-tree quantization coefficients are executed before performing run length coding but this isolated coefficient detection operation can also be carried out at the same time as carrying out the run length coding. In the following description of an algorithm for detecting isolation coefficients, as an example, N is taken to be 8. In the case of this embodiment, when all neighboring quantization coefficients are un-valued coefficients, the quantization coefficient xi is taken to be an isolated coefficient. The quantization coefficient scanning order is taken to be i (i=1 to n) and the operation of the run length coder 4 for detecting isolated coefficients is described using the flowchart shown in FIG. 11.

In step S21, 1 is set as the initial value for i, and step S27 is proceeded to. A determination is then carried out in step S27 as to whether or not all of the quantization coefficients xi of the sub-tree are isolated coefficients. When the result of this determination is NO, when the process for determining isolation coefficients for all of the sub-tree quantization coefficients is not complete, step S22 is proceeded to. In step S22, a determination is made as to whether or not the quantization coefficient x2 belongs to the lowermost layer. When the result of this determination is NO, i.e. when the quantization coefficient xi is not the lowermost layer quantization coefficient, a determination is made that this quantization coefficient is not an isolated coefficient and step S23 is proceeded to. In step S23, = is set to i+1 in order to carry out the following quantization coefficient determination and step S27 is returned to. Then, as described above, a determination is made as to whether or not isolated coefficient processing is finished for all of the sub-tree quantization coefficients. On the other hand, when the determination result of step S22 is YES, i.e. when the quantization coefficient xi is the lowermost layer quantization coefficient, step S24 is proceeded to.

In step S24, a determination is made as to whether or not the quantization coefficient xi is smaller than the prescribed threshold value Ti. When the result of this determination is NO, i.e. when the quantization coefficient xi is larger than a prescribed threshold value T1, this quantization coefficient xi is determined not to be an isolated coefficient and step S23 is proceeded to. In step S23, step S27 is returned to after setting i to i+1 in the way described above. A determination is then made as to whether or not isolated coefficient determination processing has been carried out for all of the sub-tree quantization coefficients. On the other hand, when the result of the determination of step S24 is YES, i.e. when the quantization coefficient xi is smaller than the prescribed coefficient T, step S25 is proceeded to.

In step S25, when eight or more of the quantization coefficients neighboring the quantization coefficient xi are un-valued coefficients, i.e. when a determination is made as to whether or not all of the neighboring quantization coefficients an un-valued coefficients and the result of this determination is no, that is to say when at least one of the quantization coefficients neighboring the quantization coefficients xi is not un-valued, the quantization coefficient xi is determined not to be an isolated coefficient and step S23 is proceeded to, with the same operation as described above being executed thereafter. On the other hand, when the result of the determination is YES, i.e. when all of the quantization coefficients neighboring the quantization coefficients xi are un-valued, step S26 is proceeded to.

In step S26, the quantization coefficient xi is taken to be an un-valued coefficient, and this valued coefficient is replace with an un-valued coefficient. Step S23 is then returned to and the same operation as that above is then executed thereafter.

On the other hand, in step S27 a determination is made as to whether or not a determination to determine whether or not isolated coefficients exist in the quantization coefficients for all of the sub-trees has been carried out is carried out. When the result of this determination is YES, i.e. when isolated coefficient determination processing for all of the sub-tree quantization coefficients has been completed, step S28 is proceeded to.

In step 28, a determination is made as to whether or not all of the sub-trees (three sub-trees) corresponding to the quantization coefficients for a certain low frequency band have been processed. When this determination is NO, i.e. when all of the sub-trees (three sub-trees) have not yet been processed, step S21 is returned to and processing for quantization coefficients for un-processed sub-trees is carried out in order. On the other hand, when the determination result is YES, the isolation coefficient detection process occurring at the sub-tree is complete.

The run length coder 4 is therefore capable of reliably detecting valued coefficients without deterioration in the picture quality within the un-valued strings, and the quantization coefficients can then be efficiently run length coded by considering these valued coefficients as un-valued coefficients. In the above description, a determination is made as to whether or not eight coefficients neighboring an isolated coefficient are un-valued coefficients but the range for determining reference coefficients is by no means limited in this respect, with a broader range centered about the isolated coefficient also possible. Further, the reference coefficient range for determining isolated coefficients is taken to be of a variable size and this variable size can be changed in response to the coefficient tree size.

Further, in the above example, isolated coefficients are detected in order from the low frequency band and the detected isolated coefficients are replaced with un-valued coefficients. However, it is also possible to detect isolated coefficients first for all of the coefficients and then replace isolated coefficients with un-valued coefficients from when isolation coefficient detection is completed for all of the coefficients.

A description will now be given of the run length coding when the inputted signal is a color image signal.

Figure 12:
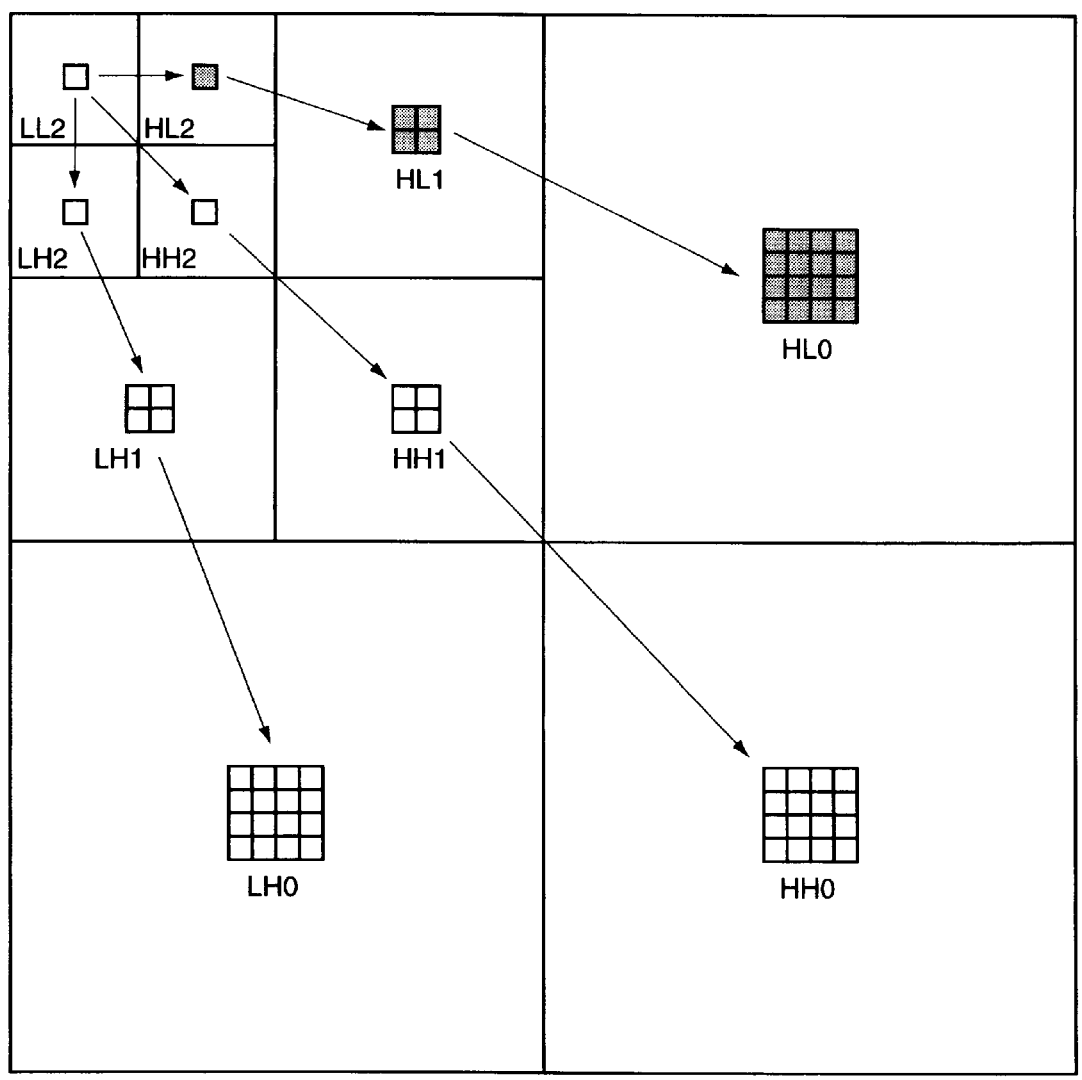
FIG. 12 is a view illustrating the operation when un-valued trees are detected for luminance components in the present invention.

When the inputted image signal comprises a color image signal, the situation where the luminance component and the chrominance component comprising this color image signal are processed separately is prominent. There is a high degree of phase correlation between un-valued coefficients of the luminance component and the chrominance component comprising this color image signal. In most cases, when all of the coefficients in the coefficient tree for the luminance portion or all of the coefficients (for example, the portion comprising the grayed-out transform coefficients in FIG. 12) of the sub-tree are un-valued coefficients, there is an extremely high possibility that the coefficients for the coefficient tree of the coefficients for the sub-tree for the corresponding chrominance portion will also be un-valued coefficients. Further, when a few valued coefficients for the sub-tree of the luminance component are isolated, the corresponding coefficients of the chrominance component coefficient tree can be considered to be un-valued coefficients.

When the chrominance component is coded at the zero tree coder 40 and the run length coder 4 and all of the sub-tree quantization coefficients xi present in the luminance portion are non-valued coefficients, coding of the quantization coefficients of the sub-trees for the corresponding chrominance component is not carried out. Further, when all of the sub-tree quantization coefficients present in the luminance portion are "not valued to an extent", i.e. when the coefficient xi (i=1 to n) of the scan string of the sub-tree for the luminance component is less than or equal to the threshold value T1. Then, as shown in FIG. 9 and described above, when N or more of the coefficients positioned within a prescribed range with respect to the coefficient xi are un-valued coefficients (in the case in this embodiment, N=8), the quantization coefficients of the sub-tree for the corresponding chrominance component are not coded. Therefore, in this embodiment where the aforementioned embodiment is applied to the luminance component and the chrominance component respectively, the quantization coefficients of the sub-trees of the chrominance component are not coded based on the zero tree coding of the luminance component and the isolated coefficient detection results. In this way, the inputted image signal can be coded in a more efficient manner taking into consideration both the luminance component and the chrominance component because the chrominance component quantization coefficients are not coded based on the above conditions even when the quantization coefficients of the chrominance components are un-valued coefficients.

Figure 13:
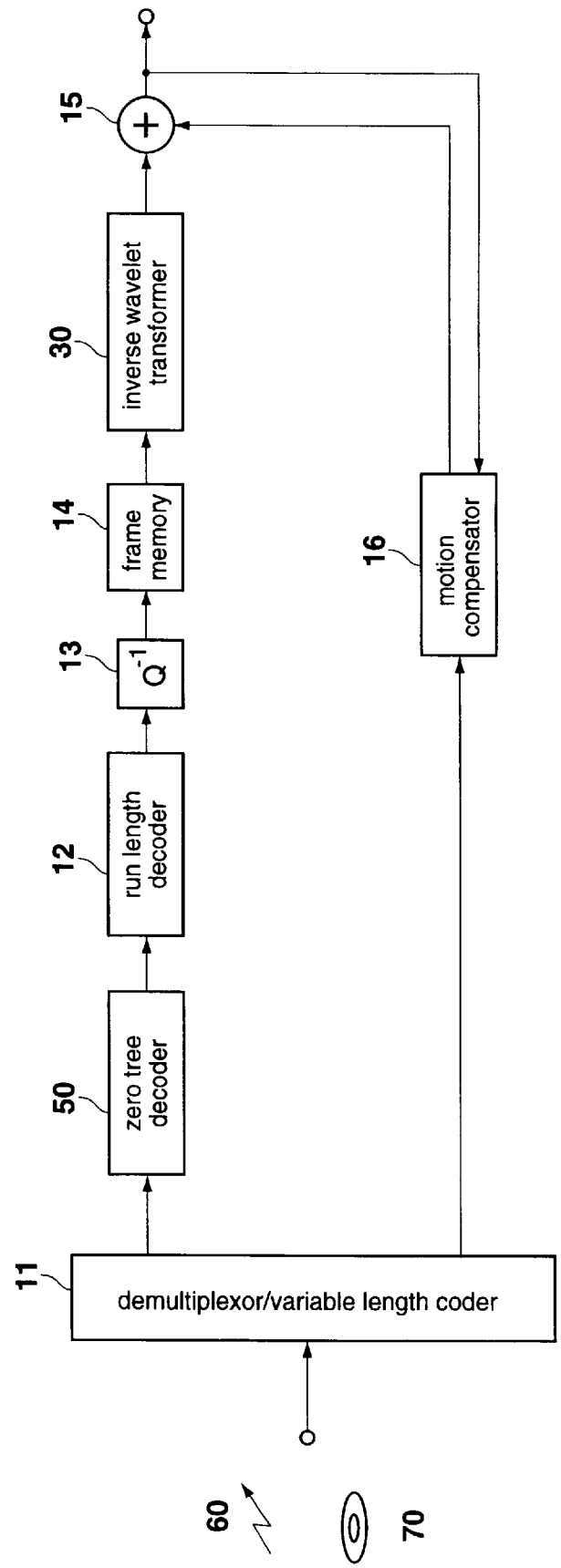
FIG. 13 is a view showing the specific circuit configuration of an image signal decoding device to which the present invention is applied.

Next, an image signal decoding device to which the present invention is applied is described using FIG. 13.

The image signal decoding device to which the present invention is applied is for receiving, via a receiver not shown in the drawings, coded bitstreams transmitted via a broadcast system or network system transmission path 60 or for playing back coded bitstreams from a recording medium 70 using a playback device not shown in the drawings. This coded bitstream is data obtained by, for example, sub-band coding an image signal inputted at the image signal coding device so as to generate a plurality of frequency band signals, with each of these frequency band signals then being quantized. Then, with respect to the plurality of quantized frequency band signals, the quantization coefficients of the lowermost frequency band are coded using zero tree coding, quantization coefficients existing at spatially the same position in each hierarchy corresponding to the quantization coefficients for this lowermost frequency band are then picked out and sub-trees are generated. These sub-trees are then S-scanned in a direction from the uppermost layer to the lowermost layer and scan strings are generated. The coded data and motion vectors generated by executing run length coding on the quantization coefficients of these scan strings is then variable length coded to obtain the data of the coded bitstream.

This coded bitstream is then supplied to the demultiplexor/variable length decoder 11 via the input terminal. The demultiplexor/variable length decoder 11 then separates the variable length coded data and the motion vectors V from this coded bitstream. Decoding that is the reverse of the variable length coding occurring at the variable length coder/multiplexor 6 of the image signal coding device is then carried out on the variable length coded data and the motion vectors V and the decoded lowermost frequency band signals, valued coefficients, run length coded sub-tree quantization coefficients and decoded motion vectors and then played back.

The demultiplexor/variable length decoder 11 supplies the decoded lowermost frequency band symbols and valued coefficients and the run length coded sub-tree quantization coefficients to the zero tree decoder 50 and the motion vectors V to the motion compensator 16.

The zero tree decoder 50 outputs all of the quantization coefficients included in coefficient trees corresponding to symbols and valued coefficients showing run length decoded low frequency band quantization coefficients and sub-tree quantization coefficients corresponding to these quantization coefficients from the symbols expressing the lowermost frequency band quantization coefficients. Namely, when the symbol "value" is allotted to this quantization coefficient, the lowermost frequency band quantization coefficients and the three run length coded sub-tree quantization coefficients are sequentially outputted. Further, when the symbol "valued_zero_tree_root" is allotted to the lowermost frequency band quantization coefficient, the valued coefficients allotted to the lowermost frequency band are outputted as quantization coefficients and un-valued coefficients are allotted to the sub-tree quantization coefficients corresponding to these quantization coefficients. Moreover, when the symbols "zero_tree_root" are allotted to the quantization coefficients for this lowermost frequency band, the quantization coefficients for this lowermost frequency band and the un-valued coefficients for the sub-tree quantization coefficients corresponding to this quantization coefficient are allotted and outputted. This low frequency band quantization coefficient and the sub-tree scan order of quantization coefficients corresponding to this quantization coefficient are supplied to the run length decoder 12.

The run length decoder 12 carries out run length decoding on run length coded sub-tree quantization coefficients supplied from the zero tree decoder 50. Namely, the run length coded sub-tree quantization coefficients are run length decoded using the same scan order as used at the run length coder 4 of the image signal coding device. The run length decoder 12 then outputs all of the quantization coefficients of the sub-trees for each quantization coefficient of the lowermost frequency band to the dequantizer 13.

The quantization coefficients of the lowermost frequency band from the run length decoder 12 and the quantization coefficients of the order of the scan string of the sub-trees corresponding to these quantization coefficients are supplied to the dequantizer 13. The dequantizer 13 has the same quantization step as the dequantizer 7 of the image signal coding device and the quantization coefficients are dequantized using this quantization step. Wavelet transform coefficients corresponding to the wavelet transforms occurring at the image signal coding device are then generated and the wavelet transform coefficients of the low frequency band are supplied to the frame memory 14. The sub-tree wavelet transform coefficients corresponding to these wavelet transform coefficients are then supplied to the frame memory 14 in the order of the scan string.

Each of the wavelet transform coefficients supplied to the frame memory 14 are stored at prescribed addresses of the frame memory. The wavelet transform coefficients of the lowermost frequency band supplied from the dequantizer 13 and the wavelet transform coefficients in scan string order for the sub-trees corresponding to these wavelet transform coefficients are stored temporarily in a matrix shape in order from the upper left to the lower right in frame memory (shown in FIGS. 3A and 3B). Each of the frequency band signals comprising the wavelet transform coefficients are then outputted in an order corresponding to the order of inputting to the frame memory of the image signal coding device. Namely, the frame memory 14 re-configures the coefficient trees from the wavelet transform coefficients supplied in scan string order and the re-configured and each wavelet transform coefficient for the re-configured coefficient trees is temporarily stored in spatially the same position for each hierarchy. Coefficients belonging to the same frequency band are then collectively read and supplied to the inverse wavelet transformer 30.

Specifically, as, for example, shown in FIGS. 3A and 3B, the frame memory 14 reads coefficients for each of the groups LL2, LH2, HL2 and HH2 of the uppermost layer and the groups LH1, HL1 . . . of the layer #1 and supplies these groups to the inverse wavelet transformer 30. In other words, at, for example, the uppermost layer, the frame memory 14 supplies a low frequency band signal belonging to a low frequency band in both the horizontal and vertical directions of the image, a signal belonging to the low frequency band in only the horizontal direction, a signal belonging to the low frequency band in only the vertical direction and a signal belonging to the high frequency band in both the horizontal and vertical directions to the inverse wavelet transformer 30.

The inverse wavelet transformer 30 generates an estimation error signal corresponding to the output signal of the adder 1 of the image signal coding device by synthesizing the plurality of frequency band signals comprising wavelet transform coefficients supplied from the frame memory.

Figure 14:
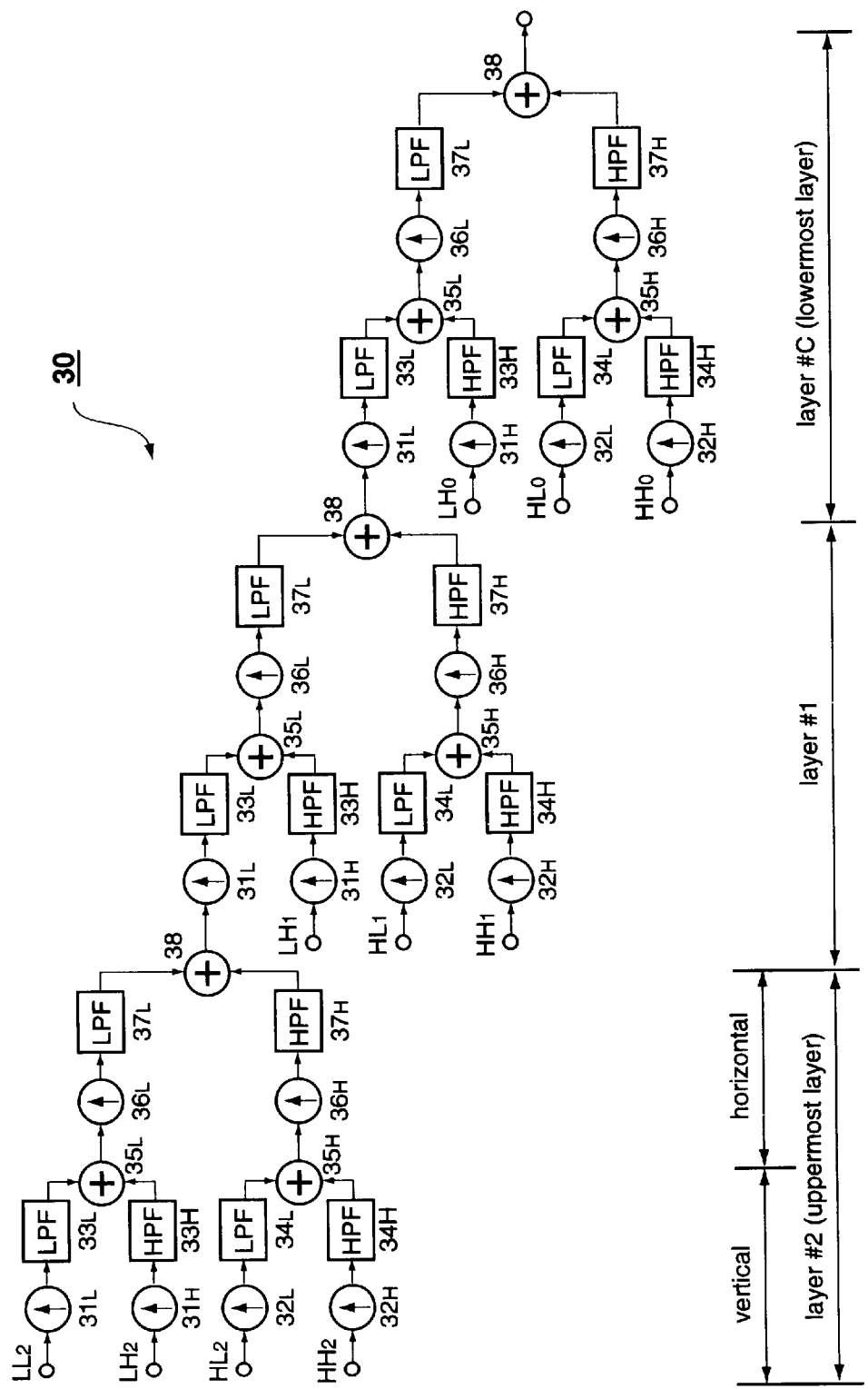
FIG. 14 is a view showing a specific circuit configuration for an inverse wavelet transformer comprising an image signal decoding device.

A description will now be given of the inverse wavelet transformer 30. An example configuration of the inverse wavelet transformer 30 is shown in FIG. 14. This inverse wavelet transformer 30 shows an inverse wavelet transformer for carrying out three stage band synthesis corresponding to the wavelet transformer of the image signal coding device. As shown in FIGS. 3A and 3B, the frequency band signals LL2, LH2, HL2, HH2, LH1, HL1, HH1, LH0, HL0 and HH0 for each of the frequency bands comprising the wavelet transform coefficients are supplied to each of the up samplers of the inverse wavelet transformer 30 via each input terminal.

With the uppermost layer, low frequency band signals belonging to the lowermost frequency band (group LL2 of the uppermost layer (layer #2)) in both the horizontal and vertical direction of the image are supplied to the three stage up-sampler 31L. The up-sampler 31L then up-samples the supplied lowermost frequency in the vertical direction and the frequency band signal up-sampled in the vertical direction is supplied to a LPF 33L. Further, frequency band signals belonging to the low frequency band (group LH2 of the uppermost layer (layer #2)) in only the horizontal direction are supplied to the up-sampler 31H. The up-sampler 31H then up-samples the supplied frequency band signal in the vertical direction and supplies the frequency band signal up-sampled in the vertical direction to a HPF 33H. The frequency band signal belonging to the low frequency band (group HL2 of the uppermost layer (layer #2)) in only the vertical direction is supplied to an up-sampler 32L. The up-sampler 32L then up-samples this provided frequency band signal in the vertical direction and supplies the frequency band signal up-sampled in the vertical direction to an LPF 34. Further, frequency band signals belonging to high frequency band (group HH2 of the uppermost layer) in both the horizontal and vertical directions are supplied to an up-sampler 32H, each of the supplied frequency band signals are up-sampled and frequency band signals up-sampled in the vertical direction are supplied to an HPF 34H. Namely, these up-samplers 31L, 31H, 32L and 32H carry out up-sampling by one line portions of signal that are all zero between each line. Here, the order of the number of stages is the opposite of the signal flow and is made to correspond to each stage of the image signal coding device.

The LPF 33 allows the low frequency band component of the supplied up-sampled frequency band signal to pass and supplies the obtained low frequency band signal to an adder 35L. The HPF 33H allows the high frequency component of the supplied up-sampled frequency band signal to pass and supplies the obtained high frequency band signal to the adder 35L. The adder 35L then adds the supplied low frequency band signal and high frequency band signal and then supplies a frequency band signal synthesized from the frequency band of LL2 and the frequency band of LH2 to an up-sampler 36L.

Moreover, LPF 34L allows low frequency components of the supplied up-sampled frequency band signal to pass and supplies the obtained low frequency band signal to an adder 35H. Further, the HPF 34H allows high frequency components of the supplied up-sampled frequency band signal to pass and supplies the obtained high frequency band signal to the adder 35H. The adder 35H then adds the low frequency band signal and high frequency band signal supplied and supplies a frequency band signal synthesized from the frequency band of HL2 and the frequency band of HH2 to an up-sampler 36H.

The up-sampler 36L up-samples the supplied frequency band signal of the adder 35L and supplies the up-sampled frequency band signal to the LPF 37L. Further, the up-sampler 36H up-samples the frequency band signal supplied from the adder 35H and supplies the up-sampled frequency band signal to the HPF 37H. The up-samplers 36L and 36H then double the sample interval occurring in the horizontal direction of the image and carry out up-sampling by inserting samples having a value of zero at positions in the center of each sample.

The LPF-37L allows low frequency components of the supplied up-sampled frequency band signal to pass and supplied the obtained frequency band signal to an adder 38. The HPF 37H allows high frequency components of the supplied up-sampled frequency band signal to pass and supplies the obtained high frequency band signal to the adder 38. The adder 38 then adds the supplied low frequency band signal and high frequency band signal and outputs an frequency band signal synthesized from the frequency bands LL2, LH2, HL2 and HH2.

A frequency band signal synthesized from the frequency band signals for each of the groups LL2, LH2, HL2 and HH2 of the uppermost layer is outputted from the adder 38. This synthesized frequency band signal is then supplied to the second stage up-sampler 31L as a frequency band signal belonging to the low frequency band in both the horizontal and vertical directions of layer #1.

The frequency band signal belonging to the frequency bands of the groups LH1, HL1 and HH1 of layer #1 is supplied to the second stage up-samplers 31H, 32L and 32H other than the up-sampler 31L of this second stage. The second stage up-samplers 31L, 31H, 32L, 32H, 36L, 36H, the filters LPF 33L, 34L, 37L, HPF 31H, 32H and 37H, and the adders 35L, 35H and 38 synthesize each of the frequency band signals, as do the components of the third stage. Signals that belong to the low frequency bands in both the horizontal and vertical directions of the uppermost layer (layer #0) are then generated and theses signals are supplied to the first stage up-sampler 31L.

Further, frequency band signals belonging to the frequency bands of the groups LH0, HL0 and HH0 of the uppermost layer (layer #0) are supplied to the first stage up-samplers 31H, 32L and 32H other than the first stage up-sampler 31L. The up-samplers 31L, 31H, 32L, 32H, 36L and 36H, LPF 33L, 34L and 37L, HPF 31H, 32H and 37H, and adders 35L, 35H and 38 of the first stage then similarly synthesize each of the frequency band signals. An estimation error signal (the inputted image signal in the case of intra coding) corresponding to the output of the adder 1 of the image signal coding device is then generated and this estimation error signal is supplied to an adder 15 shown in FIG. 10. The operation of up-samplers 31L, 31H, 32L, 32H, 36L and 36H, LPF 33L, 34L and 37L, HPF 31H, 32H and 37H, and adders 35L, 35H and 38 of the first and second stages is the same as the operation of each part of the third stage and a detailed description with regards to the same coding will therefore be omitted.

The estimation error signal from the inverse wavelet transformer 30 is supplied to the adder 15. The adder 15 then adds the motion compensated estimation reference image signal supplied from the motion compensator 16 and the estimation error signal supplied from the inverse wavelet transformer 30 and generates the original image signal, i.e. an image signal corresponding to the input of the adder 1 of the image signal coding device, with this image signal then being supplied to the motion compensator 16 and a display device (not shown in the drawings) such as, for example, a television or monitor etc. The image signal supplied to the motion compensator 16 is stored in a frame memory, not shown in the drawings, within the motion compensator 16. When the image signal is provided in the case of intra estimation coding, this image signal is outputted from the adder 15 without modification and supplied to the motion compensator 16 and, for example, a display device (not shown in the drawings) such as, for example, a television or monitor, etc.

The motion compensator 16 then temporarily stores this image signal in a frame memory not shown in the drawings. The estimation image signal stored in the frame memory is then motion compensated and read based on motion vector V supplied from the dequantizer/variable length coder 11 while the following frame image signal is being estimation decoded. This motion compensated estimation image signal is then supplied to the adder 15 as the estimation reference image signal described above.

The present invention is by no means limited to the above embodiment. For example, the gain of the first stage LPFs and HPFs occurring at the wavelet transformer 20 of the image signal coding device, the gain of the second stage LPFs and HPFs, and the gain of the third stage HPFs and LPFs can be made to become progressively larger. For example, the gain of the second stage can be made the square root of two-times larger than that of the first stage and the gain of the third stage can be made the square root of two-times larger than that of the second stage. A quantization function can then be given to the wavelet transformer 20. The quantization can also be made non-linear. Further, for example, in the aforementioned embodiment, band-dividing wavelet transforms are used but the inputted image signal can also be band-divided using so-called quadrature mirror filters. Further, in the number of stages for band-dividing was shown to be three, but the number of stages can be made to be more than this so as to be, for example, four or five, providing that the scope of the present invention is not strayed from.

The order of transmitting the coded data is, however, by no means limited to the embodiment of the present invention.

In this embodiment, the wavelet transform coefficients are quantized, with zero tree coding and run length coding then being carried out on the quantized coefficients. However, in the present invention, quantization does not have to be carried out, and the sub-band/wavelet transform coefficients can simply be zero tree and run length coded.

In the present invention, an inputted image signal is hierarchically divided into a plurality of frequency bands via sub-band dividing, and a plurality of frequency band signals are generated. Coefficients existing at the same position spatially in each hierarchical level obtained by band-dividing this plurality of frequency band signals are then picked out and a coefficient tree is generated. Zero tree coding is then carried out on the coefficients of the lower-most frequency band of the coefficient tree. Each sub-tree is then S-scanned in a direction from-the uppermost layer (low frequency band) to the lowermost layer (high frequency band) and a scan string is generated. This scan string is then run length coded and coded data is generated. As a result, in the present invention, transform coefficients occurring in sub-band/wavelet code can be coded in a more efficient manner than in the related method and device without any deterioration in essential picture quality and the amount of transmission data can therefore be substantially reduced.

Further, in the present invention, run length decoding is carried out on the coded data obtained in the way described above and scan strings are generated, with a plurality of trees being re-configured from these scan strings. Each coefficient of the re-configured coefficient trees are then arranged at the same position spatially within each hierarchical layer and a plurality of frequency band signals are generated from each coefficient arranged at the same position spatially at each hierarchical layer. The plurality of frequency band signals are then sub-band/wavelet decoded and the original image signal is reproduced. As a result of this, an original image signal can be reproduced from a coded image signal coded in a more efficient manner.

Further, in the present invention, because the number of bits required to code transform coefficients can be reduced without the quality of the coded picture deteriorating, a method capable of detecting isolated coefficients existing in the lowermost layer can be provided. Further, in the present invention, the value of chrominance component coefficients can be determined based on the luminance component when the coded image signal is a color image signal. A method can therefore be provided chrominance component coefficients can be run length coded in an efficient manner.

The embodiment of the present invention is realize in terms of hardware using block diagrams, but the present invention is by no means limited in this respect and can also be realized in terms of software using a CPU and memory etc. The image coding and image decoding algorithm of the present invention can therefore also be realized using a computer program, i.e. can be realized as an image coding program and an image decoding program. In this case, the computer program is used recorded on a recording medium such as a semiconductor memory or disc etc.

In this case, the image coding program and image decoding program can also be provided to a terminal, etc., via a network.

Various variations and applications can be considered without straying from the scope of the present invention and the essential essence of the present invention is therefore by no means limited to the above embodiment.

What is claimed is:

1. An image coding device for coding an image signal, using sub-band transforms, comprising:

a transformer for hierarchically dividing the inputted image signal into a plurality of frequency bands using sub-band transforms, said sub-band transforms being wavelet transforms, and generating a plurality of frequency band signals, with each frequency band signal comprising wavelet transform coefficients; and a coder for coding sub-band transform coefficients of said each frequency band signal using zero tree coding and run length coding;

said coder comprising:

a quantizer for quantizing said wavelet transform coefficients of each frequency band signal;

a coefficient tree generator for picking-out quantization coefficients existing at spatially identical positions of each layer obtained by band dividing with respect to said plurality of frequency band signals and generating a coefficient tree, said coefficient tree comprising lowermost frequency band quantization coefficients and a plurality of sub-trees, each sub-tree comprising a plurality of quantization coefficients in a direction from the lower most frequency band to the upper most frequency band and said quantization coefficients being wavelet transform coefficients quantized at said quantizer;

a zero tree coder for zero tree coding quantization coefficients of the lowermost frequency band of said coefficient tree; and a run length coder for run length coding quantization coefficients of said each sub-tree in a direction from low frequency bands to high frequency bands.

2. An image coding device according to claim 1, wherein said coder has a scan string generator for S-scanning said sub-tree quantization coefficients in a direction from low frequency bands to high frequency bands and generating an S-scan string quantization coefficient, and said run length coder run length codes S-scan string quantization coefficients.

3. An image coding device according to claim 2, wherein said run length coder determines whether or not a scan string quantization coefficient is valued or un-valued and allots a run number to un-valued coefficients.

4. An image coding device according to claim 2, wherein said run length coder determines whether or not quantization coefficients are isolated in the scan string and performs run length coding for un-valued coefficients.

5. An image coding device according to claim 2, wherein said zero tree coder transmits code indicating that all sub-tree scan string quantization coefficients are un-valued quantization coefficients in place of the sub-tree quantization coefficients when all sub-tree scan string quantization coefficients are un-valued quantization coefficients.

6. An image coding device according to claim 2, wherein said coder performs coding by utilizing correlation of a luminance component and chrominance component when said inputted image signal is coded divided as a luminance component and a chrominance component.

7. An image coding device according to claim 2, wherein said coefficient tree generator comprises:

a plurality of lower most frequency band quantization coefficients and a plurality of sub-trees corresponding to the plurality of lower most frequency band quntization coefficients, each sub-tree comprising a plurality of quantization coefficients formed in a direction going from a low frequency band to a high frequency frequency band.

8. An image coding device according to claim 7, wherein said coder has a scan string generator for S-scanning said sub-tree quantization coefficients in a direction from low frequency bands to high frequency bands and generating an S-scan string quantization coefficient, and said run length coder run length codes S-scan string quantization coefficients.

9. An image coding method for an image signal, using sub-band transforms, comprising the steps of:

hierarchically dividing the inputted image signal into a plurality of frequency bands using sub-band transforms, said sub-band transforms being wavelet transforms, and generating a plurality of frequency band signals, with each frequency band signal comprising wavelet transform coefficients; and coding sub-band transform coefficients of said each frequency band signal using zero tree coding and run length coding;

said coding step comprising the steps of:

quantizing said wavelet transform coefficients of each frequency band signal using a quantizer;

picking-out quantization coefficients existing at spatially identical positions of each layer obtained by band dividing with respect to said plurality of frequency band signals and generating a coefficient tree, said coefficient tree comprising lowermost frequency band quantization coefficients and a plurality of sub-trees, each sub-tree comprising a plurality of quantization coefficients in a direction from the lower most frequency band to the upper most frequency band and said quantization coefficients being wavelet transform coefficients quantized in said quantization step;

zero tree coding quantization coefficients of the lowermost frequency band of said coefficient tree; and run length coding quantization coefficients of said each sub-tree in a direction from low frequency bands to high frequency bands.

10. An image coding method according to claim 9, wherein said coding step has a scan string generating step for S-scanning said sub-tree quantization coefficients in a direction from low frequency bands to high frequency bands and generating an S-scan string quantization coefficient, and said run length coding step run length codes S-scan string quantization coefficients.

11. An image coding method according to claim 10, wherein said run length coding step determines whether or not a scan string quantization coefficient is valued or un-valued and allots a run number to un-valued coefficients.

12. An image coding method according to claim 10, wherein said run length coding step determines whether or not quantization coefficients are isolated in the scan string and performs run length coding for un-valued coefficients.

13. An image coding method according to claim 10, wherein said zero tree coding step transmits code indicating that all sub-tree scan string quantization coefficients are un-valued quantization coefficients in place of the sub-tree quantization coefficients when all sub-tree scan string quantization coefficients are un-valued quantization coefficients.

14. An image coding method according to claim 9, wherein said coding step performs coding by utilizing correlation of a luminance component and chrominance component when said inputted image signal is coded divided as a luminance component and a chrominance component.

15. An image coding method according to claim 9, wherein said coefficient tree comprises:

a plurality of lower most frequency band quantization coefficients and a plurality of sub-trees corresponding to the plurality of lower most frequency band quantization coefficients, each sub-tree comprising a plurality of quantization coefficients formed in a direction going from a low frequency band to a high frequency band.

16. An image coding method according to claim 15, wherein said coding step has a scan string generator for S-scanning said sub-tree quantization coefficients in a direction from low frequency bands to high frequency bands and generating an S-scan string quantization coefficient, and said run length coding step run length codes S-scan string quantization coefficients.

17. An image signal decoding device for decoding coded data generated by hierarchically dividing an inputted image signal into a plurality of frequency bands using sub-band transforms which are wavelet transforms, generating a plurality of frequency band signals comprising sub-band transform coefficients and coding said sub-band transform coefficients of each of said frequency band signals using zero tree coding and run length coding and generating a decoded image signal, comprising:

a decoder for decoding said coded data using zero tree decoding and run length decoding and generating each frequency band signal comprising wavelet transform coefficients, with each of said frequency band signals comprising a plurality of wavelet transform coefficients; and a synthesizer for synthesizing wavelets of each of said frequency band signals and generating a decoded image signal;

said wavelet transform coefficients of each frequency band signal being quantized by a quantizer and said decoder including a de-quantizer for de-quantizing quantized wavelet transform coefficients for each of said frequency band signals;

said coded data being generated by:

picking-out quantization coefficients existing at spatially identical positions of each layer obtained by band dividing with respect to said plurality of frequency band signals and generating a coefficient tree, said coefficient tree comprising lowermost frequency band quantization coefficients and a plurality of sub-trees, each sub-tree comprising a plurality of quantization coefficients in a direction from the lower most frequency band to the upper most frequency band and said quantization coefficients being wavelet transform coefficients quantized at said quantizer;

zero tree coding quantization coefficients of the lowermost frequency band of said coefficient tree; and run length coding quantization coefficients of said each sub-tree in a direction from low frequency bands to high frequency bands, and said decoder comprising:

a run length decoder for run length decoding said coded data and decoding each sub-tree quantization coefficient; and a zero tree decoder for zero tree decoding quantization coefficients of lower most frequency bands of said sub-trees and generating each of said frequency band signals.

18. An image signal decoding device according to claim 17, wherein said coded data is generated by S-scanning said sub-tree quantization coefficients in a direction from low frequency bands to high frequency bands, S-scan string quantization coefficients are generated and said S-scan string quantization coefficients are run length coded, and said run length decoder carries out run length decoding in accordance with said S-scan string.

19. An image signal decoding device according to claim 18, wherein said coded data is generated by determining whether said S-scan string quantization coefficients are valued coefficients or un-valued coefficients and allotting a run number to non-valued coefficients.

20. An image signal decoding device according to claim 18, wherein said coded data is generated by determining whether or not quantization coefficients are isolated in a scan string, with non-valued coefficients then being run length coded.

21. An image signal decoding device according to claim 18, said coded data having code indicating that all quantization coefficients of a sub-tree scan string are un valued when all quantization coefficients of a sub-tree scan string are un valued, wherein said zero tree decoder determines transmission conditions of quantization coefficients of each coefficient tree sub-tree from said code and generates quantization coefficients for each sub-tree of a coefficient tree in response to the results of this determination.

22. An image signal decoding device according to claim 18, wherein said coded data is generated by coding using correlation of a luminance component and a chrominance component when said inputted image signal is coded divided into a luminance component and a chrominance component.

23. An image signal decoding device according to claim 17, wherein said coefficient tree comprises quantization coefficients for a plurality of low frequency bands and a plurality of sub-trees corresponding to this plurality of low frequency band quantization coefficients, with each sub-tree comprising a plurality of quantization coefficients formed in a direction from low frequency bands to high frequency bands.

24. An image signal decoding device according to claim 23, wherein said coded data is generated by S-scanning quantization coefficients of said sub-trees in a direction from low frequency bands to high frequency bands and generating S-scan string quantization coefficients, with said run length decoder carrying out run length decoding in accordance with said S-scan string quantization coefficients.

25. An image signal decoding method for decoding coded data generated by hierarchically dividing an inputted image signal into a plurality of frequency bands using sub-band transforms which are wavelet transforms, generating a plurality of frequency band signals comprising sub-band transform coefficients and coding said sub-band transform coefficients of each of said frequency band signals using zero tree coding and run length coding and generating a decoded image signal, comprising the steps of:

decoding said coded data using zero tree decoding and run length decoding and generating each frequency band signal comprising wavelet transform coefficients, with each of said frequency band signals comprising a plurality of wavelet transform coefficients; and synthesizing wavelets of each of said frequency band signals and generating a decoded image signal;

said wavelet transform coefficients of each frequency band signal being quantized and said decoding step including a de-quantizing step for de-quantizing quantized wavelet transform coefficients for each of said frequency band signals;

said coded data being generated by:

picking-out quantization coefficients existing at spatially identical positions of each layer obtained by band dividing with respect to said plurality of frequency band signals and generating a coefficient tree, said coefficient tree comprising lowermost frequency band quantization coefficients and a plurality of sub-trees, each sub-tree comprising a plurality of quantization coefficients in a direction from the lower most frequency band to the upper most frequency band and said quantization coefficients being wavelet transform coefficients quantized at a quantizer;

zero tree coding quantization coefficients of the lowermost frequency band of said coefficient tree; and run length coding quantization coefficients of said each sub-tree in a direction from low frequency bands to high frequency bands, and said decoding step comprising the steps of:

run length decoding said coded data and decoding each sub-tree quantization coefficient; and zero tree decoding quantization coefficients of lower most frequency bands of said coefficient tree and generating each of said frequency band signals.

26. An image signal decoding method according to claim 25, wherein said coded data is generated by S-scanning said sub-tree quantization coefficients in a direction from low frequency bands to high frequency bands, S-scan string quantization coefficients are generated and said S-scan string quantization coefficients are run length coded, and said run length decoding step carries out run length decoding in accordance with said S-scan string.

27. An image signal decoding method according to claim 25, wherein said coded data is generated by determining whether said S-scan string quantization coefficients are valued coefficients or un-valued coefficients and allotting a run number to non-valued coefficients.

28. An image signal decoding method according to claim 26, wherein said coded data is generated by determining whether or not quantization coefficients are isolated in a scan string, with non-valued coefficients then being run length coded.

29. An image signal decoding method according to claim 26, said coded data having code indicating that all quantization coefficients of a sub-tree scan string are un-valued when all quantization coefficients of a sub-tree scan string are un-valued, wherein said zero tree decoding step determines transmission conditions of quantization coefficients of each coefficient tree sub-tree from said code and generates quantization coefficients for each sub-tree of a coefficient tree in response to the results of this determination.

30. An image signal decoding method according to claim 26, wherein said coded data is generated by coding using correlation of a luminance component and a chrominance component when said inputted image signal is coded divided into a luminance component and a chrominance component.

31. An image signal decoding method according to claim 25, wherein said coefficient tree includes quantization coefficients for a plurality of low frequency bands and a plurality of sub-trees corresponding to this plurality of low frequency band quantization coefficients, with each sub-tree comprising a plurality of quantization coefficients formed in a direction from low frequency bands to high frequency bands.

32. An image signal decoding method according to claim 31, wherein said coded data is generated by S-scanning quantization coefficients of said sub-trees in a direction from low frequency bands to high frequency bands and generating S-scan string quantization coefficients, with said run length decoding step carrying out run length decoding in accordance with said S-scan string quantization coefficients.

33. A recording medium capable of being decoded by an image signal decoding device said recording medium being recorded with a recording signal generated by:

hierarchically dividing the inputted image signal into a plurality of frequency bands using sub-band transforms said sub-band transforms being wavelet transforms, and generating a plurality of frequency band signals, with each frequency band signal comprising wavelet transform coefficients; and coding sub-band transform coefficients of said each frequency band signal using zero tree coding and run length coding by quantizing said wavelet transform coefficients of each frequency band signal;

said coding step comprising the steps of:

picking-out quantization coefficients existing at spatially identical positions of each layer obtained by band dividing with respect to said plurality of frequency band signals and generating a coefficient tree, said coefficient tree comprising lowermost frequency band quantization coefficients and a plurality of sub-trees, each sub-tree comprising a plurality of quantization coefficients in a direction from the lower most frequency band to the upper most frequency band and said quantization coefficients being wavelet transform coefficients quantized at said quantizing step;

zero tree coding quantization coefficients of the lowermost frequency band of said coefficient tree; and run length coding quantization coefficients of each said sub-tree in a direction from low frequency bands to high frequency bands.

34. A recording medium according to claim 33, wherein said coding step has a scan string generating step for S-scanning said sub-tree quantization coefficients in a direction from low frequency bands to high frequency bands and generating an S-scan string quantization coefficient, and said run length coding step run length codes S-scan string quantization coefficients.

35. A recording medium according to claim 33, wherein said coefficient tree comprises:

a plurality of lower most frequency band quantization coefficients and a plurality of sub-trees corresponding to the plurality of lower most frequency band quantization coefficients, each sub-tree comprising a plurality of quantization coefficients formed in a direction from low frequency bands to high frequency bands.

36. A recording medium according to claim 35, wherein said coding step has a scan string generating step for S-scanning said sub-tree quantization coefficients in a direction from low frequency bands to high frequency bands and generating an S-scan string quantization coefficient, and said run length coding step run length codes S-scan string quantization coefficients.

* * * * *